(12) United States Patent
Tsujii

(10) Patent No.: US 8,339,679 B2
(45) Date of Patent: Dec. 25, 2012

(54) IMAGE PROCESSING APPARATUS, METHOD, AND MEDIUM STORING PROGRAM THEREOF FOR GENERATING IMAGE DATA HAVING A DOT IMAGE USED TO SUPPRESS INFORMATION LEAKAGE

(75) Inventor: Takaya Tsujii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 745 days.

(21) Appl. No.: 12/511,586

(22) Filed: Jul. 29, 2009

(65) Prior Publication Data

US 2010/0046036 A1 Feb. 25, 2010

(30) Foreign Application Priority Data

Aug. 25, 2008 (JP) .................................. 2008-215920

(51) Int. Cl.
*H04N 1/40* (2006.01)
*G06K 9/00* (2006.01)
(52) U.S. Cl. ........................ 358/3.28; 358/3.24; 382/100
(58) Field of Classification Search .................... None
See application file for complete search history.

(56) References Cited

U.S. PATENT DOCUMENTS

| | | | | |
|---|---|---|---|---|
| 7,149,451 | B2 * | 12/2006 | Uchida et al. | 399/81 |
| 7,609,396 | B2 * | 10/2009 | Harada | 358/1.1 |
| 7,742,197 | B2 | 6/2010 | Takiyama et al. | |
| 7,809,152 | B2 * | 10/2010 | Zhao et al. | 382/100 |
| 2003/0179399 | A1 | 9/2003 | Matsunoshita | 358/1.13 |
| 2003/0179412 | A1 * | 9/2003 | Matsunoshita | 358/3.28 |
| 2008/0019746 | A1 | 1/2008 | Takiyama et al. | |
| 2009/0027702 | A1 | 1/2009 | Sakai | |

FOREIGN PATENT DOCUMENTS

| | | |
|---|---|---|
| JP | 2001-197297 | 7/2001 |
| JP | 2003-280469 | 10/2003 |
| JP | 2006-340279 A | 12/2006 |
| JP | 2008-048378 A | 2/2008 |
| JP | 2008-186146 A | 8/2008 |

OTHER PUBLICATIONS

Japanese Office Action dated May 8, 2012 in Japanese Patent Appln. No. 2008-215920.

* cited by examiner

*Primary Examiner* — Twyler Haskins
*Assistant Examiner* — Barbara Reinier
(74) *Attorney, Agent, or Firm* — Fitzpatrick, Cella, Harper & Scinto

(57) ABSTRACT

A region of a latent image and that of a background image in a first dot image are converted into binary data so as to have different binary data, and a region of the latent image in the binary data is converted into dot data by expressing that region as dots. A second dot image is converted into outline data by removing dots of a region corresponding to the region of the latent image to form an outline region. The converted dot data and converted outline data are composited to generate a dot image including the outline data as a latent image and the dot data as a background image.

7 Claims, 30 Drawing Sheets

3501

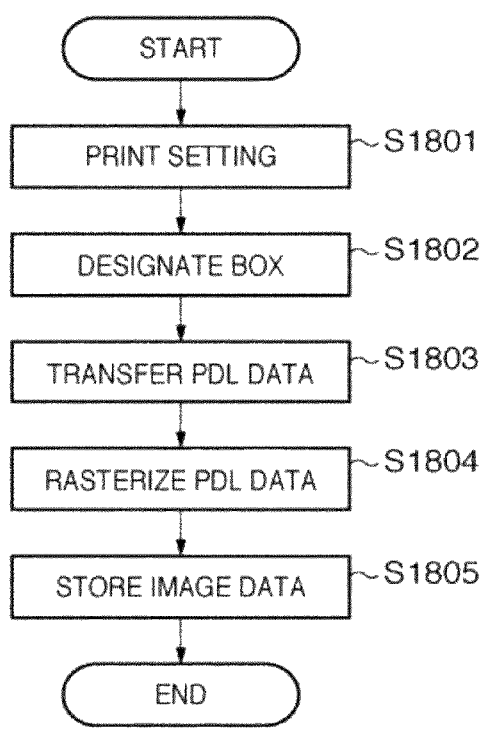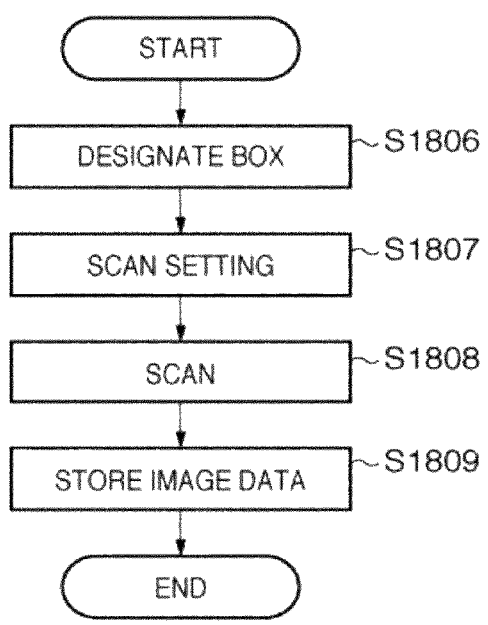
FIG. 14A
FIG. 14B

2101

19a     19b

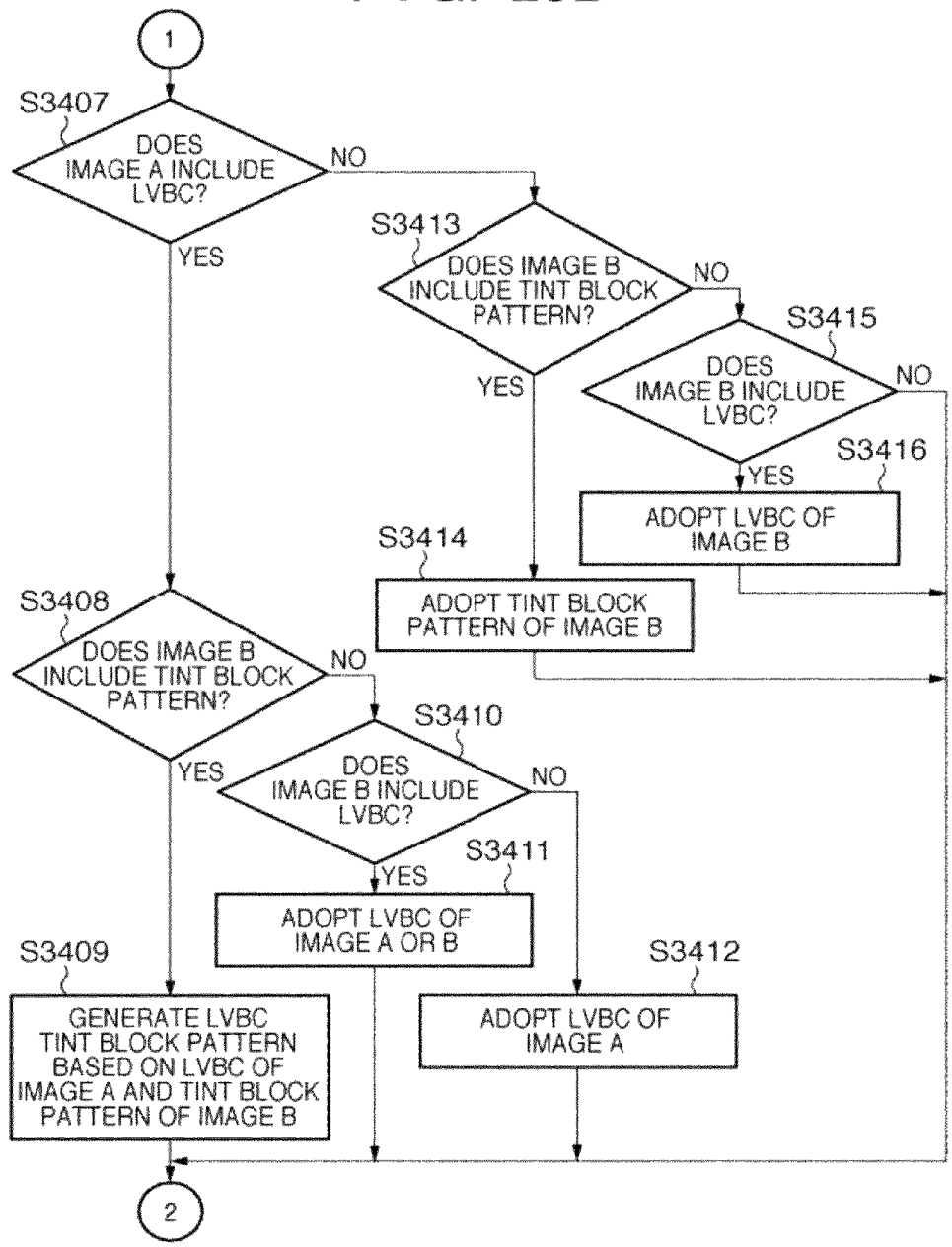

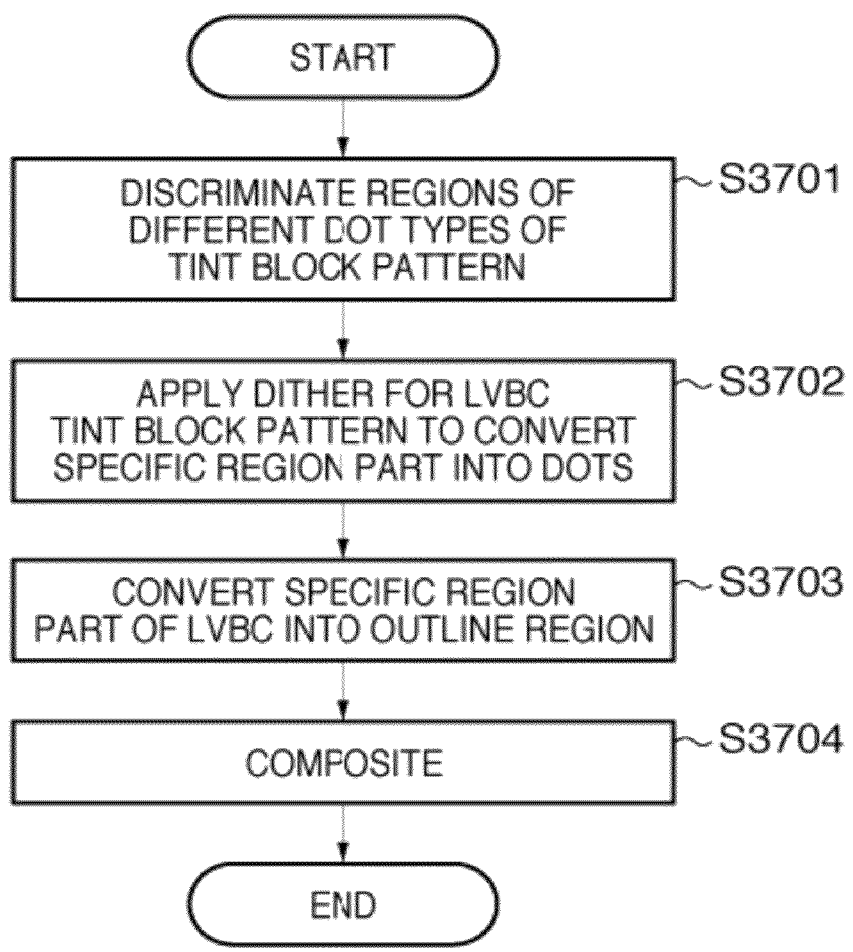

2901

3601

F I G. 25
3501

3301

IMAGE PROCESSING APPARATUS, METHOD, AND MEDIUM STORING PROGRAM THEREOF FOR GENERATING IMAGE DATA HAVING A DOT IMAGE USED TO SUPPRESS INFORMATION LEAKAGE

BACKGROUND OF THE INVENTION

1. Field of the Invention

The present invention relates to an image processing apparatus, method, and medium storing a program, which generate image data processed to suppress information leakage.

2. Description of the Related Art

Conventionally, for the purpose of inhibiting or suppressing form documents, resident cards, and the like from being copied, such content is printed on paper called copy protection paper that has undergone special printing. When such copy protection paper is copied using, for example, a copying machine, a character string "Copy Inhibited" emerges on a copied material although such character string is difficult for the human eye to see on an original material. Then, such paper produces an effect of making one who copied that paper pause use of the copied material. Furthermore, since one already recognizes that a form document or the like is printed on copy protection paper, such paper produces an effect of suppressing or warning against copying itself.

However, such copy protection paper requires higher cost than normal paper. Also, only a character string set at the time of manufacture of copy protection paper can emerge, and that paper has limited uses, resulting in poor flexibility in terms of applications of use.

On the other hand, along with the progress of digitization of various contents, contents such as form documents and resident cards are similarly digitized. However, digitization of these form documents and resident cards is in transition, and a content created using an information processing apparatus is normally output onto paper using, for example, a printer at the time of use.

As such situation demands, a technique which generates copy protection paper, which was conventionally prepared in advance by printmaking, using an information processing apparatus and printer attracts a lot of attention (Japanese Patent Laid-Open No. 2001-197297). With this technique, upon printing out a content, image data called a tint block pattern is generated in addition to content data, and these data are output in a superimposed manner. The tint block pattern is sometimes called a copy-forgery-inhibited pattern. The tint block pattern seems like a simple pattern or background image for the human eye on an original material (a printed material output by a printer). However, when that original material is copied, a predetermined character string, image, or the like is visualized. This original material can give the same warning effect as in the aforementioned copy protection paper. This technique can be achieved due to the remarkable advances in printer performance.

When a tint block pattern created using an information processing apparatus is output to be superimposed on content data, since it can be output using normal print paper, a cost reduction can be attained compared to use of the copy protection paper, which is prepared in advance. Furthermore, since a tint block pattern can be generated upon printing out content data, a character string to be visualized upon copying an original material can be freely determined as well as the color and the like of the tint block pattern. Alternatively, an output date and time, information unique to a printer, and the like can advantageously be used as a tint block pattern.

As described above, when an original material is copied, a predetermined character string or the like which is unrecognizable before copying is visualized, and a tint block pattern achieves an effect of suppressing one from using that copied material. In order to achieve this effect, a tint block pattern to be generated basically includes a region where the same image as an original material also remains on a copied material and a region where an image which exists on the original material disappears on the copied material or is diluted compared to that on the region where the image remains. The tint block pattern including these two regions preferably has nearly equal densities on these two regions when it is printed out.

That is, the printout tint block pattern has to be configured so that a hidden character string to be visualized on a copied material is difficult to be macroscopically recognized by the human visual sense. An image region of this tint block pattern which is hidden on a printout material but appears to be visually recognizable by the human visual sense on a copied material obtained by copying that printout material will be referred to as a "latent image" hereinafter. Also, an image region which disappears after copying or has a lower density than that of the latent image visualized on the copied material will be referred to as a "background (or background image)" hereinafter for the descriptive purpose. The tint block pattern basically includes the latent image and background image.

The latent image is formed of dots concentrated in a predetermined region. By contrast, the background part is formed of dots dispersed in a predetermined region. By setting the nearly equal dot densities in these regions, the latent image part and background part can hardly be distinguished on the printout material of the tint block pattern.

FIG. 30 is a view showing the states of dots in these two image regions. As shown in FIG. 30, the tint block pattern is configured by a background part in which dots are formed at dispersed positions in a predetermined region, and a latent image part in which dots are formed at concentrated positions. The dots in these two regions can be generated by halftone dot processing or dither processing under different conditions. For example, when a tint block pattern is generated using the halftone dot processing, it is desired that halftone dot processing using a low LPI value is applied to a latent image part, and that using a high LPI value is applied to a background part. Furthermore, when a tint block pattern is generated using the dither processing, it is desired that dither processing using a dot-concentrated dither matrix is applied to a latent image part, and that using a dot-dispersed dither matrix is applied to a background part.

In general, a reader unit and image forming unit of a copying machine have a limit level of reproduction ability depending on the input resolution of reading small dots on a document and the output resolution of reproducing small dots. When dots of the background part of the tint block pattern are formed to be smaller than the limit level of dots that can be reproduced by the copying machine, and dots of the latent image part are formed to be larger than the limit level, the dots of the latent image part can be reproduced, but the smaller dots of the background part cannot be reproduced on a copied material. By using such characteristic, a latent image is visualized on a copied material obtained by copying the tint block pattern. An image which is visualized on a copied material will be referred to as a visible image hereinafter. Even when the background part is reproduced by copying, the same effect as that obtained when dots are not reproduced can be obtained as long as the latent image part on the copied material can be clearly recognized.

Images 31a and 31b in FIG. 31 show visualization of a latent image. FIG. 31 conceptually depicts that an image formed of concentrated dots is visualized on a copied material, but an image formed of dispersed dots is not reproduced on the copied material.

Note that the tint block pattern printing is not limited to the above configuration as long as a character string or the like can be reproduced on a copied material at a recognizable level. That is, when a character string or the like is designated as a background part, and is visualized as an outline character string on a copied material, the tint block pattern printing can achieve its object.

On the other hand, in addition to the tint block pattern printing, a system which embeds tracking information in a paper medium itself in addition to a main body image using an information embedding technique such as LVBC (Low Visibility Barcodes) has been proposed. According to this system, if information leakage by means of a paper medium has occurred, tracking information can be extracted by analyzing a leaked document. When one carelessly brings out a document, his or her responsibility can be pursued based on the tracking information, and a suppression effect can be expected. Furthermore, a system which embeds copy job control information that inhibits copying on a paper medium itself upon execution of printing has also been proposed. In this system, a corresponding printer extracts the copy job control information to detect permission or inhibition of copying upon execution of copying, thereby allowing control over continuation or abortion of copying for each page. A system which embeds password information and permitted user information as condition information in place of simple copy control used to determine permission or inhibition, and permits only a specific user to copy has also been proposed (Japanese Patent Laid-Open No. 2003-280469). Note that the tint block pattern and LVBC will be collectively referred to as security dots hereinafter.

However, in the related art, when an image processing apparatus inadvertently composites images on documents including security dots, the security dots may be broken. For example, assume that a certain document includes a tint block pattern, and another document includes LVBC data. When image data of these documents are composited, and composite image data is output, since the security dots of both the tint block pattern and LVBC are embedded, each others' security dots interfere with each other and are broken, and the effect of a security function as an output material is lost.

SUMMARY OF THE INVENTION

The present invention provides an image processing apparatus which can composite security dots of different types so as not to interfere with each other.

The present invention in its first aspect provides an image processing apparatus for generating image data having a dot image used to suppress information leakage, comprising: a generation unit configured to composite a first dot image which is visually recognizable on a copied material and includes a latent image and a background image used to suppress information leakage, and a second dot image embedded with information used to suppress information leakage to generate a third dot image including the latent image and the information used to suppress information leakage; and an image data generation unit configured to generate image data having the third dot image by compositing the third dot image and predetermined image data.

The present invention in its second aspect provides an image processing method executed by an image processing apparatus for generating image data having a dot image used to suppress information leakage, comprising: a generation step of compositing a first dot image which is visually recognizable on a copied material and includes a latent image and a background image used to suppress information leakage, and a second dot image embedded with information used to suppress information leakage to generate a third dot image including the latent image and the information used to suppress information leakage; and an image data generation step of generating image data having the third dot image by compositing the third dot image and predetermined image data.

The present invention in its third aspect provides a computer-readable medium storing an image processing program for generating image data having a dot image used to suppress information leakage, the image processing program making a computer function to: composite a first dot image which is visually recognizable on a copied material and includes a latent image and a background image used to suppress information leakage, and a second dot image embedded with information used to suppress information leakage to generate a third dot image including the latent image and the information used to suppress information leakage; and generate image data having the third dot image by compositing the third dot image and predetermined image data.

According to the present invention, security dots of different types can be composited so as not to interfere with each other.

Further features of the present invention will become apparent from the following description of exemplary embodiments with reference to the attached drawings.

BRIEF DESCRIPTION OF THE DRAWINGS

FIG. 14A is a flowchart showing a box registration sequence using PDL data;

FIG. 14B is a flowchart showing a box registration sequence using scan data;

FIG. 20B is a flowchart showing details of security dot control processing upon compositing images A and B in this embodiment;

FIG. 21 is a flowchart showing the sequence of processing upon compositing a tint block pattern image and LVBC image in steps S3405 and S3409 shown in FIGS. 20A and 20B;

FIG. 25 is a view showing an example of an outline image generated from the LVBC image shown in FIG. 22;

DESCRIPTION OF THE EMBODIMENTS

Figure 1:
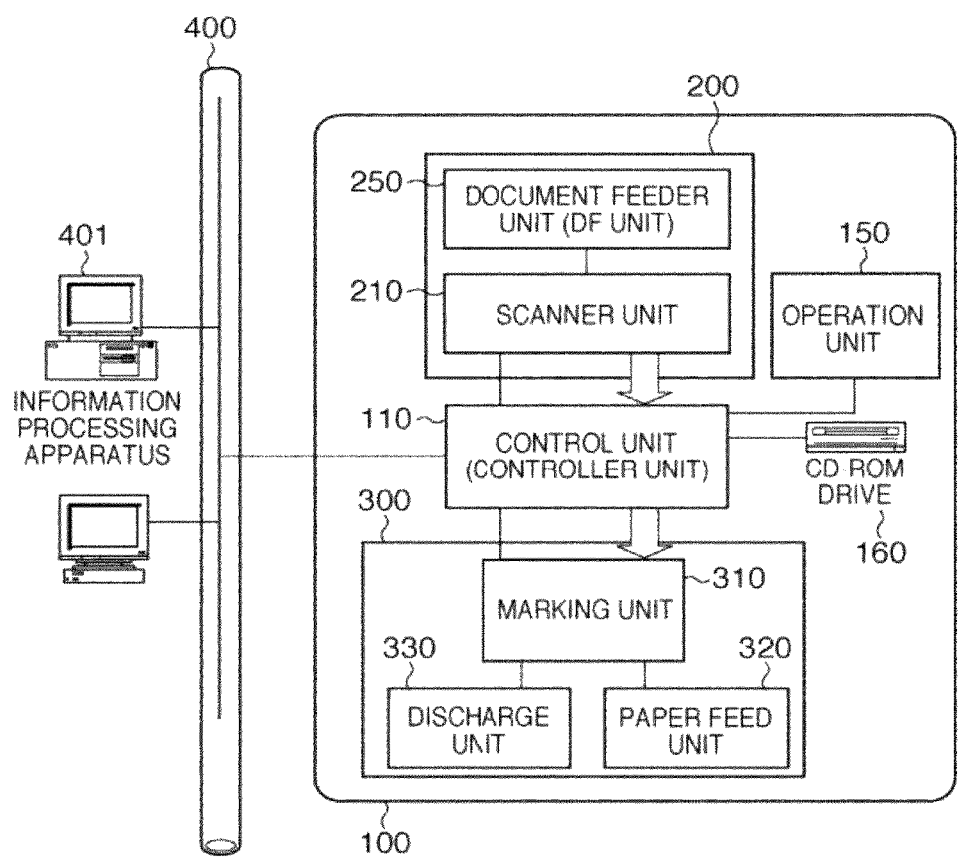
FIG. 1 is a block diagram showing the arrangement of an image processing apparatus according to an embodiment of the present invention.

The best mode of carrying out the present invention will be described in detail hereinafter with reference to the drawings. Note that the same reference numerals denote the same components, and a repetitive description thereof will be avoided.

<Overall Arrangement of Image Processing Apparatus>

The overall arrangement of an image processing apparatus according to an embodiment of the present invention will be described below with reference to FIG. 1. FIG. 1 is a block diagram showing the arrangement of an image processing apparatus 100 according to an embodiment of the present invention. Referring to FIG. 1, a reader unit 200 (image input unit) optically reads a document image, and converts it into image data. The reader unit 200 includes a scanner unit 210 having a function of reading a document, and a document feeder unit 250 having a function of conveying document sheets.

A printer unit 300 (image output unit) conveys a print paper sheet, prints image data on that sheet as a visible image, and discharges the printed sheet outside the apparatus. The printer unit 300 includes a paper feed unit 320 having a plurality of types of print paper cassettes, a marking unit 310 which transfers and fixes image data on a print paper sheet, and a discharge unit 330 which has a function of sorting and stapling the printed print paper sheets, and outputting them outside the apparatus.

A control unit 110 (controller unit) is electrically connected to the reader unit 200 and printer unit 300, and also to an information processing apparatus 401 via a network 400 such as Ethernet (registered trademark). The control unit 110 provides a copy function by controlling the reader unit 200 to read document image data, and controlling the printer unit 300 to output image data onto a print paper sheet. The control unit 110 also provides a scanner function and printer function. The scanner function converts read image data from the reader unit 200 into code data, and transmits the code data to the information processing apparatus 401 via the network 400. The printer function converts code data received from the information processing apparatus 401 via the network 400 into image data, and outputs the image data to the printer unit 300.

The control unit 110 can read data stored in a CD-ROM from a memory drive (CD-ROM drive) 160. An operation unit 150 is connected to the control unit 110, includes a liquid crystal touch panel, and provides a user I/F (interface) used to operate the image processing apparatus 100.

Figure 2:
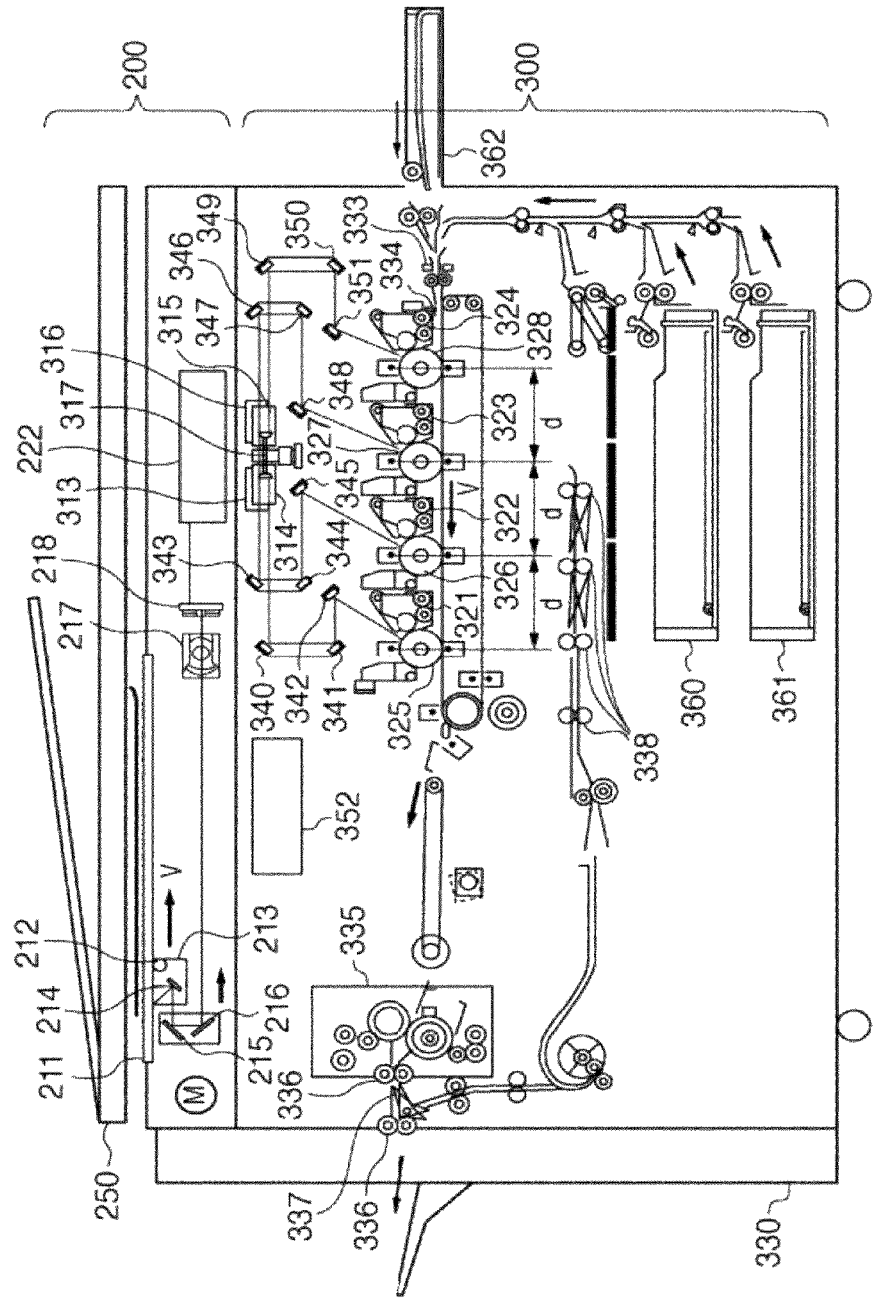
FIG. 2 is a sectional view showing the overall structure of a reader unit and printer unit shown in FIG. 1.

FIG. 2 is a sectional view showing an overview of the reader unit 200 and printer unit 300 shown in FIG. 1. The document feeder unit 250 in the reader unit 200 feeds documents one by one in turn from the uppermost one onto a platen glass 211, and discharges the document on the platen glass 211 after completion of the document reading operation. When a document is fed onto the platen glass 211, the reader unit 200 turns on a lamp 212 and begins to move an optical unit 213 to exposure and scan the document. Reflected light from the document at that time is guided to a CCD image sensor (to be referred to as a CCD hereinafter) 218 by mirrors 214, 215, and 216, and a lens 217. The CCD 218 reads an image of the document scanned in this way.

A reader image processing unit 222 applies predetermined processing to image data output from the CCD 218, and outputs the processed image data to the control unit 110 via a scanner I/F 140 (to be described later). A printer image processing unit 352 outputs an image signal sent from the control unit 110 via a printer I/F 145 (to be described later) to a laser driver 317.

The laser driver 317 in the printer unit 300 drives laser emission units 313, 314, 315, and 316 to emit laser beams according to image data output from the printer image processing unit 352. Photosensitive drums 325, 326, 327, and 328 are irradiated with these laser beams via mirrors 340, 341, 342, 343, 344, 345, 346, 347, 348, 349, 350, and 351. Then, latent images according to the laser beams are formed on the photosensitive drums 325, 326, 327, and 328.

Developers 321, 322, 323, and 324 respectively develop the latent images by toners of black (Bk), yellow (Y), cyan (C), and magenta (M). The developed toner images of the respective colors are transferred onto a paper sheet, and are printed out as a full-color image.

A paper sheet, which is fed at a timing synchronized with the laser irradiation start timing from one of paper cassettes 360 and 361 and a manual insert tray 362, is attracted on and conveyed by a transfer belt 334 via registration rollers 333. Then, toner images formed on the photosensitive drums 325, 326, 327, and 328 are transferred onto the print sheet.

The print sheet on which the toner images are transferred is conveyed to a fixing unit 335, and the toner images are fixed on the print sheet by heat and pressure of the fixing unit 335. The print sheet which has left the fixing unit 335 is discharged by discharge rollers 336. The discharge unit 330 bundles and sorts the discharged print sheets, and staples the sorted print sheets.

When a booklet print mode is set, after the print sheet is conveyed to the position of the discharge rollers 336, it is then guided onto a re-feed convey path 338 by a flapper 337 by rotating the discharge rollers 336 in the reverse direction. The print sheet guided onto the re-feed convey path 338 is fed onto the transfer belt 334 at the aforementioned timing.

<Reader Image Processing Unit>

Figure 3:
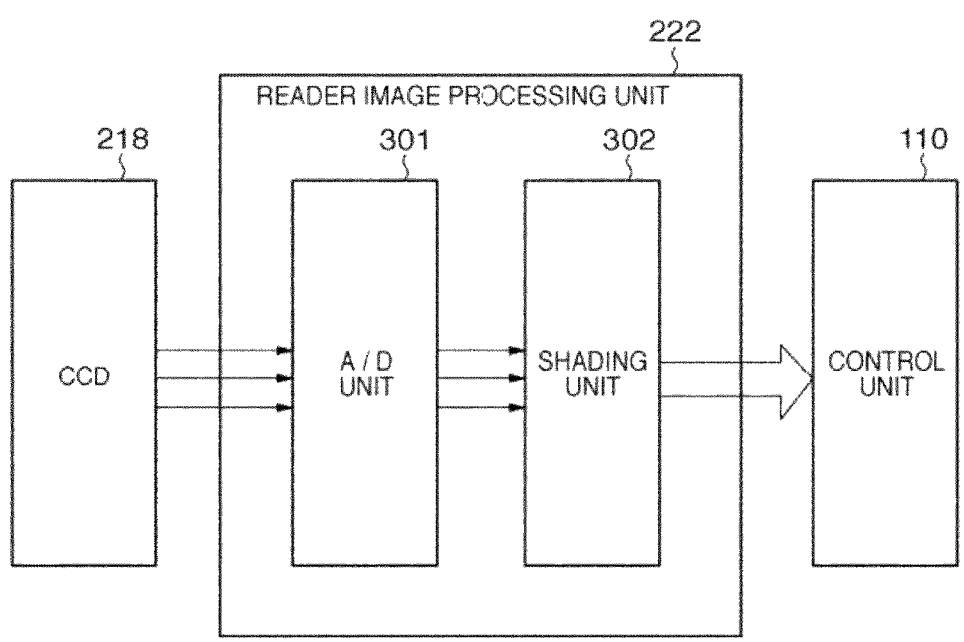
FIG. 3 is a block diagram showing the arrangement of a reader image processing unit shown in FIG. 2.

FIG. 3 is a block diagram showing the detailed arrangement of the reader image processing unit 222 shown in FIG. 2. In this reader image processing unit 222, an image of a document on the platen glass 211 is read by the CCD 218, and is converted into electrical signals. Note that when this CCD 218 includes a color sensor, RGB color filters may be set in line on a 1-line CCD in the order of RGB, or R, G, and B filters may be arranged for respective CCDs of 3-line CCDs. Also, filters may have on-chip structures or may be arranged independently of the CCD.

Electrical signals (analog image signals) output from the CCD 218 are input to the reader image processing unit 222. An A/D unit 301 samples and holds (S/H) the electrical signals, clamps the dark levels of the analog image signals to a reference potential, and amplifies the signals to a predetermined level, that is, A/D-converts the analog image signals into 8-bit RGB digital signals. Note that the sample & hold, clamping, and amplifying operations are not limited to the aforementioned order.

A shading unit 302 applies shading correction and black correction to the RGB signals output from the A/D unit 301, and outputs the corrected RGB signals to the control unit 110.

<Control Unit>

Figure 4:
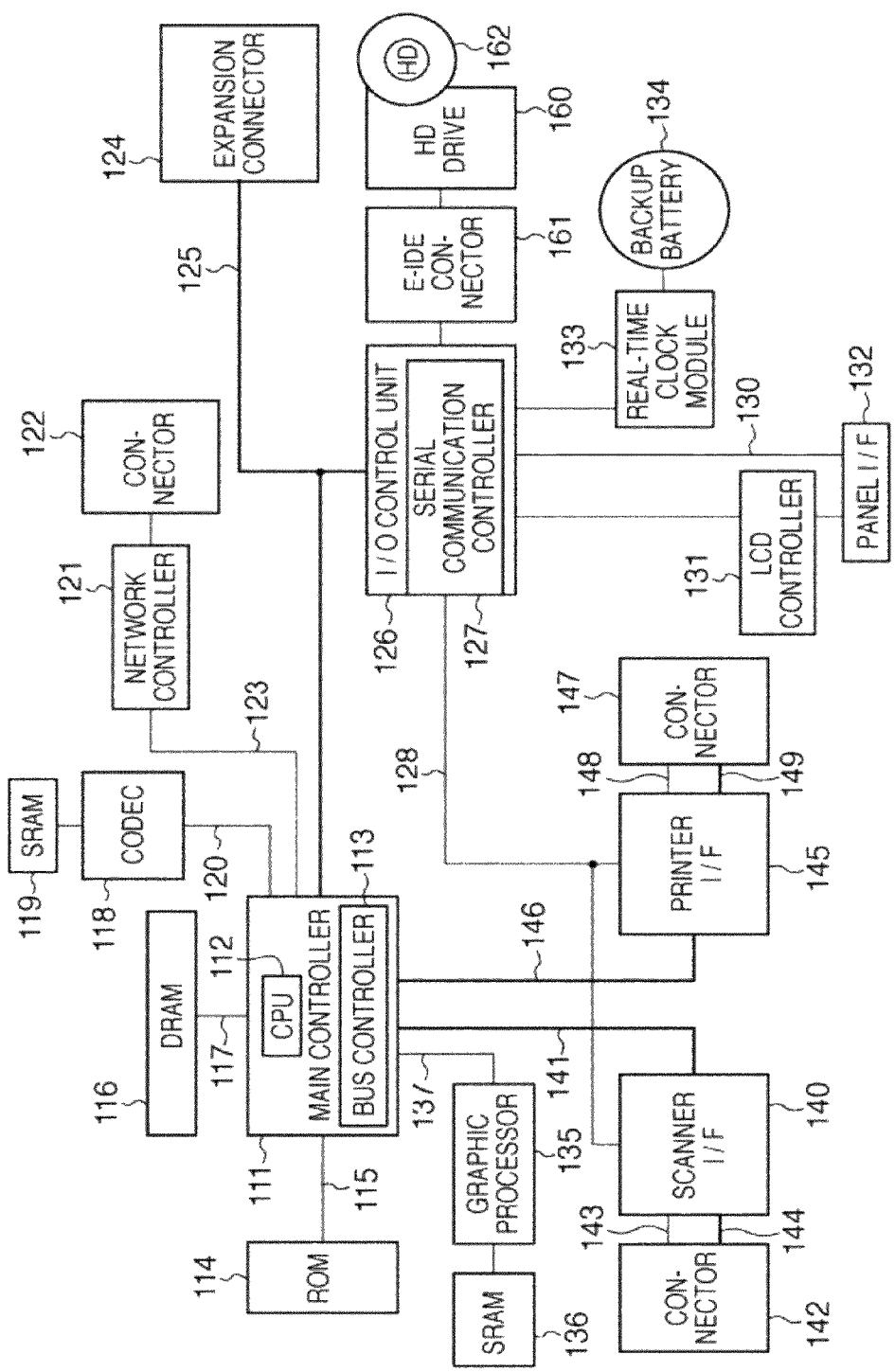
FIG. 4 is a block diagram showing the arrangement of a control unit shown in FIG. 1.

FIG. 4 is a block diagram showing the arrangement of the control unit 110 shown in FIG. 1. Referring to FIG. 4, a main controller 111 mainly includes a CPU 112, bus controller 113, and various I/F controller circuits.

The CPU 112 and bus controller 113 control the operation of the overall control unit 110. The CPU 112 operates based on a program loaded from a ROM 114 via a ROM I/F 115.

This program also describes an operation for interpreting PDL (Page Description Language) code data received from the information processing apparatus 401, and rasterizing it to image data, and this operation is processed by software. The bus controller 113 controls transfer of data input/output from/to respective I/Fs, and controls arbitration at the time of bus contention and DMA data transfer.

A DRAM 116 is connected to the main controller 111 via a DRAM I/F 117, and is used as a work area required for the operation of the CPU 112, and an area used to store image data.

A Codec 118 compresses image data stored in the DRAM 116 by a method such as MH, MR, MMR, JBIG, or JPEG, and decompresses the compressed and stored code data into image data. An SRAM 119 is used as a temporary work area of the Codec 118. The Codec 118 is connected to the main controller 111 via a Codec I/F 120, and data transfer with the DRAM 116 is controlled by the bus controller 113 to attain DMA transfer.

A graphic processor 135 executes image rotation, image scaling, color space conversion, and binarization processes for image data stored in the DRAM 116. An SRAM 136 is used as a temporary work memory of the graphic processor 135. The graphic processor 135 is connected to the main controller 111 via a graphic processor I/F 137, and data transfer with the DRAM 116 is controlled by the bus controller 113 to attain DMA transfer.

A network controller 121 is connected to the main controller 111 via a network controller I/F 123, and is connected to an external network via a connector 122. As the network, Ethernet® is generally used.

To a general-purpose high-speed bus 125, an expansion connector 124 used to connect an expansion board, and an I/O control unit 126 are connected. As the general-purpose high-speed bus, for example, a PCI bus is used.

The I/O control unit 126 includes a serial communication controller 127 for two channels. The serial communication controller 127 exchanges control commands with CPUs of the reader unit 200 and printer unit 300 asynchronously. The I/O control unit 126 is connected to the scanner I/F 140 and printer I/F 145 via an I/O bus 128.

A panel I/F 132 is connected to an LCD controller 131, and includes an interface used to make display on a liquid crystal panel on the operation unit 150 and a key input I/F 130 used to receive inputs from hardware keys and touch panel keys. The operation unit 150 has a liquid crystal display unit, a touch panel input device adhered on the liquid crystal display unit, and a plurality of hardware keys. A signal input by a touch panel or a given hardware key is supplied to the CPU 112 via the aforementioned panel I/F 132, and the liquid crystal display unit displays image data sent from the panel I/F 132. The liquid crystal display unit displays functions in the operations of the image processing apparatus 100, image data, and the like.

A real-time clock module 133 updates and saves a date and time managed inside the apparatus, and is backed up by a backup battery 134.

An E-IDE connector 161 connects an external storage device. In this embodiment, the memory drive 160 is connected via this connector, so as to store image data in a hard disk 162 or read out image data from the hard disk 162.

Connectors 142 and 147 are respectively connected to the reader unit 200 and printer unit 300, and respectively include asynchronous serial I/Fs 143 and 148, and video I/Fs 144 and 149.

The scanner I/F 140 is connected to the reader unit 200 via the connector 142 and also to the main controller 111 via a scanner bus 141, and has a function of applying predetermined processing to an image received from the reader unit 200. Furthermore, the scanner I/F 140 has a function of outputting a control signal generated based on a video control signal sent from the reader unit 200 onto the scanner bus 141. Data transfer from the scanner bus 141 to the DRAM 116 is controlled by the bus controller 113.

The printer I/F 145 is connected to the printer unit 300 via the connector 147 and also to the main controller 111 via a printer bus 146. The printer I/F 145 has a function of applying predetermined processing to image data output from the main controller 111, and outputting the processed image data to the printer unit 300. Furthermore, the printer I/F 145 has a function of outputting a control signal generated based on a video control signal sent from the printer unit 300 onto the printer bus 146. Transfer of raster image data rasterized on the DRAM 116 to the printer unit is controlled by the bus controller 113. That is, the raster image data is DMA-transferred to the printer unit 300 via the printer bus 146 and video I/F 149.

<Image Processing Unit of Scanner I/F>

Figure 5:
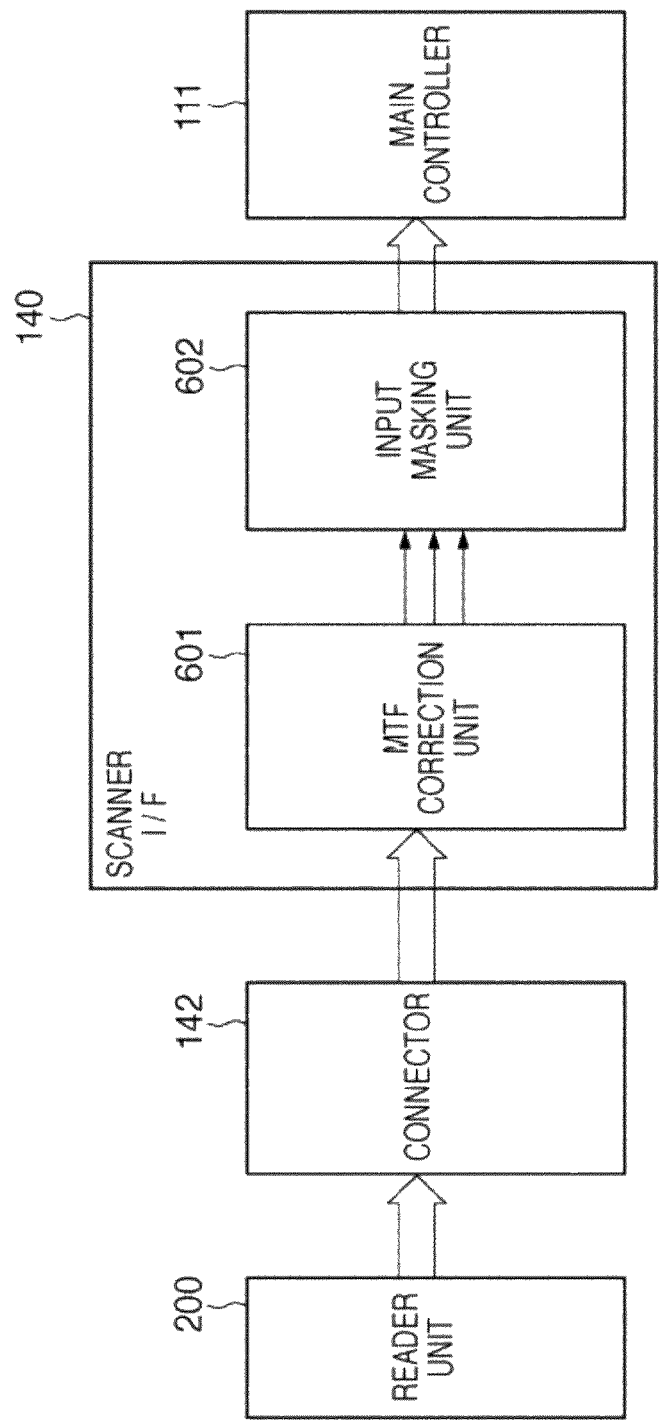
FIG. 5 is a block diagram showing the arrangement of a part that handles image processing in a scanner I/F shown in FIG. 4.

FIG. 5 is a block diagram showing the detailed arrangement of a part that handles image processing in the scanner I/F 140 shown in FIG. 4, and the same reference numerals in FIG. 5 denote the same components as in FIG. 4.

As shown in FIG. 5, MTF correction is applied first to image signals sent from the reader unit 200 via the connector 142. For example, in case of 3-line CCDS, delay amounts are produced according to read speeds due to different read positions among lines in connection processing. An MTF correction unit 601 adjusts delay amounts for respective lines according to the read speeds to correct signal timings so as to set identical read positions on the three lines. Also, the MTF correction unit 601 corrects the read MTF which has changed according to the read speeds.

An input masking unit 602 corrects the digital signals whose read position timings are corrected in terms of the spectral characteristics of the CCD 218, lamp 212, and mirrors 214, 215, and 216. The outputs from the input masking unit 602 are sent to an ACS (Auto Color Select) count unit and the main controller 111.

<Image Processing Unit of Printer I/F>

A part that handles image processing in the printer I/F 145 will be described in detail below with reference to FIG. 6.

Figure 6:
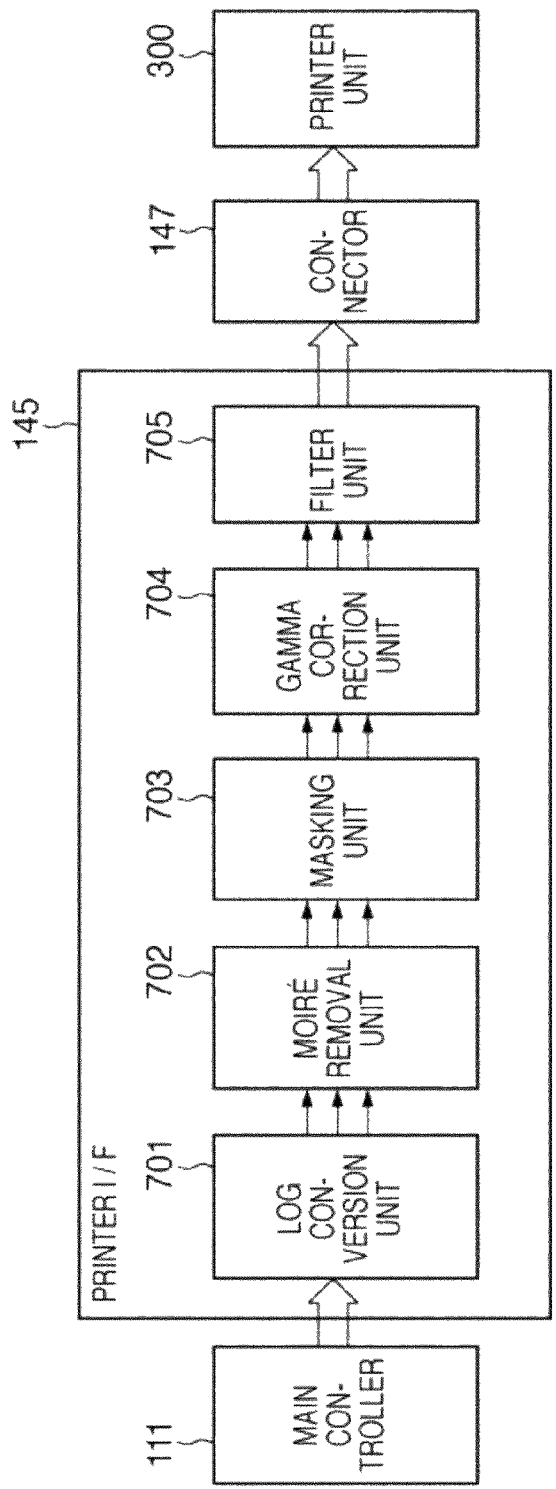
FIG. 6 is a block diagram showing the arrangement of a part that handles image processing in a printer I/F shown in FIG. 4.

FIG. 6 is a block diagram showing the detailed arrangement of a part that handles image processing in the printer I/F 145 shown in FIG. 4, and the same reference numerals in FIG. 6 denote the same components as in FIG. 4.

As shown in FIG. 6, image signals sent from the main controller 111 via the printer bus 146 are input to a LOG conversion unit 701. The LOG conversion unit 701 LOG-converts RGB signals into CMY signals.

A moiré removal unit 702 removes moiré components of the CMY signals output from the LOG conversion unit 701. A masking unit 703 applies UCR processing to the CMY signals that have undergone the moiré removal processing in the moiré removal unit 702 to generate CMYK signals. That is, the masking unit 703 corrects the CMY signal to signals that match the outputs of the printer by masking processing.

A gamma correction unit 704 adjusts the densities of the signals processed by the masking unit 703. A filter unit 705 applies smoothing or edge processing to the CMY signals that have undergone the density adjustment in the gamma correction unit 704.

The CMY signals (image) via these processes are sent to the printer unit 300 via the connector 147.

<Graphic Processor>

Figure 7:
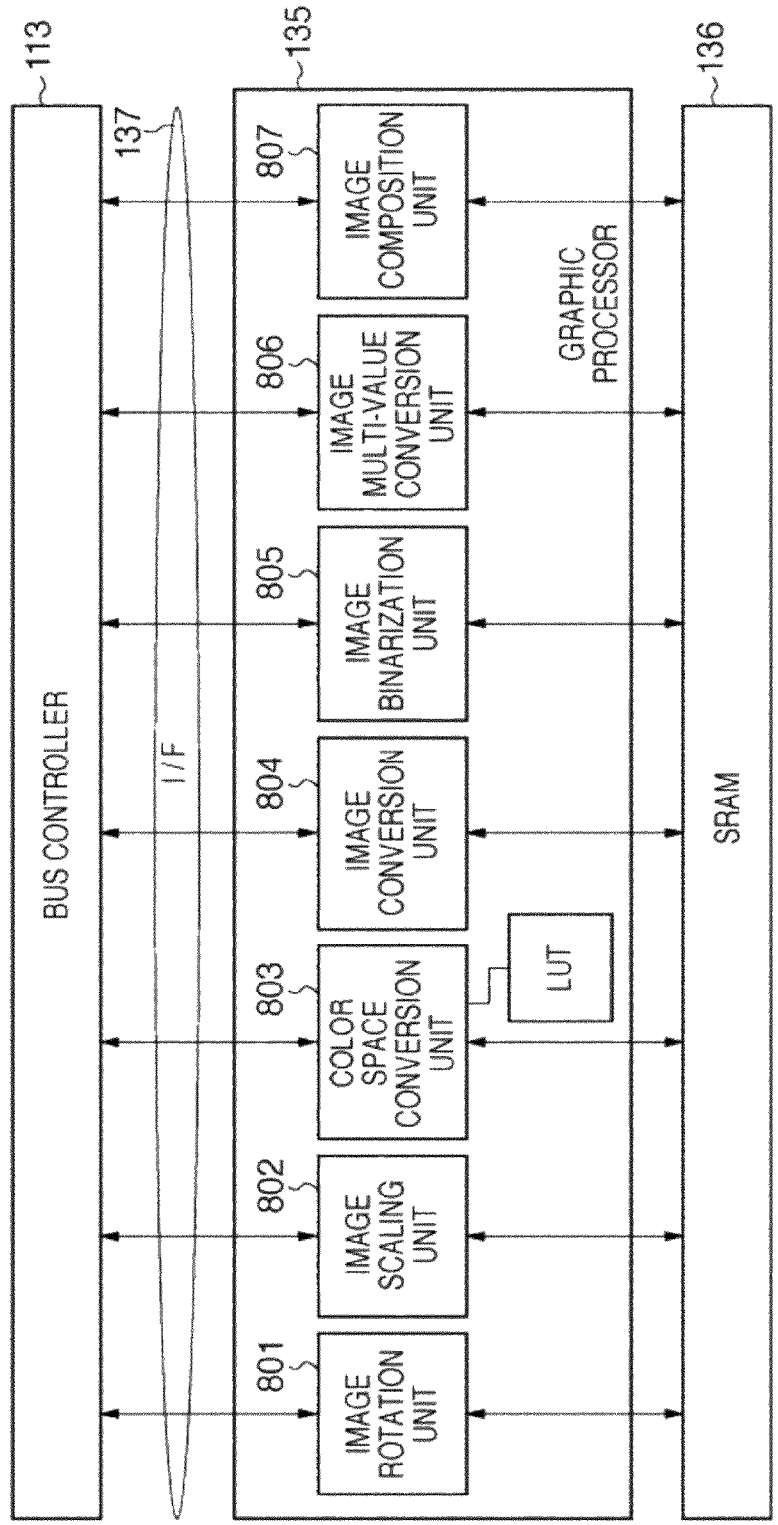
FIG. 7 is a block diagram showing the arrangement of a graphic processor shown in FIG. 4.

The graphic processor 135 will be described in detail below with reference to FIG. 7. FIG. 7 is a block diagram showing the detailed arrangement of the graphic processor 135 shown in FIG. 4, and the same reference numerals in FIG. 7 denote the same components as in FIG. 4.

As shown in FIG. 7, the graphic processor 135 has an image rotation unit 801, image scaling unit 802, color space conversion unit 803, and image binarization unit 805 as modules which respectively execute image rotation, image scaling, color space conversion, and binarization processes. The color space conversion unit 803 includes an LUT (LookUp Table).

Note that the SRAM 136 is used as temporal work areas for the respective modules of the graphic processor 135. Assume that work areas are statically assigned to the respective modules so as to prevent contention of work areas of the SRAM 136 used by the respective modules.

The graphic processor 135 is connected to the main controller 111 via the graphic processor I/F 137, and data transfer with the DRAM 116 is controlled by the bus controller 113 to attain DMA transfer.

Furthermore, the bus controller 113 executes control for setting modes and the like in the respective modules of the graphic processor 135, and timing control required to transfer image data to the respective modules.

<Image Rotation Unit>

The image rotation processing sequence in the image rotation unit 801 shown in FIG. 7 will be described below. The CPU 112 makes a setting for image rotation control in the bus controller 113. With this setting, the controller 113 makes a setting (for example, an image size, rotation direction and angle, etc.) required for image rotation in the image rotation unit 801.

After completion of the required setting, the CPU 112 sends an image data transfer permission to the bus controller 113 again. According to this permission, the bus controller 113 begins to transfer image data from the DRAM 116 or a device connected via each I/F.

The image rotation unit 801 temporarily stores the received image data in the SRAM 136, and applies the rotation processing to the image data using the SRAM 136 as an input buffer. The rotated data is written back to the SRAM 136 again, and the image rotation unit 801 reads out the image data from the SRAM 136 using it as an output buffer and transfers the readout image data to the bus controller 113.

The bus controller 113 which received the rotated image data transfers that data to the DRAM 116 or a device on each I/F.

<Image Scaling Unit>

The processing sequence in the image scaling unit 802 shown in FIG. 7 will be described below. The CPU 112 makes a setting for image scaling control in the bus controller 113. With this setting, the bus controller 113 makes a setting required for image scaling (a scale in the main scan direction, that in the sub-scan direction, an image size after scaling, etc.) in the image scaling unit 802. After completion of the required setting, the CPU 112 sends an image data transfer permission to the bus controller 113 again. According to this permission, the bus controller 113 begins to transfer image data from the DRAM 116 or a device connected via each I/F.

The image scaling unit 802 temporarily stores the received image data in the SRAM 136, and applies the interpolation processing for the required number of pixels and the required number of lines according to the main scan and sub-scan scales to the stored data using the SRAM 136 as an input buffer, thus enlarging or reducing an image (scaling processing). The scaled data is written back to the SRAM 136 again, and the image scaling unit 802 reads out the image data from the SRAM 136 using it as an output buffer and transfers the readout image data to the bus controller 113.

The bus controller 113 which received the scaled image data transfers that data to the DRAM 116 or a device on each I/F.

<Color Space Conversion Unit>

The processing sequence in the color space conversion unit 803 shown in FIG. 7 will be described below. The CPU 112 makes a setting for color space conversion control in the bus controller 113. With this setting, the bus controller 113 makes a setting required for color space conversion processing (coefficients for a matrix arithmetic operation to be described later, table values of the LUT, etc.) in the color space conversion unit 803 and LUT.

After completion of the required setting, the CPU 112 sends an image data transfer permission to the bus controller 113 again. According to this permission, the bus controller 113 begins to transfer image data from the DRAM 116 or a device connected via each I/F.

The color space conversion unit 803 applies, to each pixel of the received image data, a 3×3 matrix arithmetic operation given by:

$$\begin{pmatrix} X \\ Y \\ Z \end{pmatrix} = \begin{pmatrix} a11 & a12 & a13 \\ a21 & a22 & a23 \\ a31 & a32 & a33 \end{pmatrix} \begin{pmatrix} R+b1 \\ G+b2 \\ B+b3 \end{pmatrix} + \begin{pmatrix} c1 \\ c2 \\ c3 \end{pmatrix}$$

where R, G, and B are inputs, X, Y, and Z are outputs, a11, a12, a13, a21, a22, a23, a31, a32, a33, b1, b2, b3, c1, c2, and c3 are coefficients.

With the arithmetic operation given by the above equation, various color space conversions such as conversion from an RGB color space into a Yuv color space can be attained.

The color space conversion unit 803 then applies conversion using the LUT to the data after the matrix arithmetic operation. With this conversion, nonlinear conversion can also be attained. Alternatively, by making a through table setting, LUT conversion can be practically skipped.

After that, the color space conversion unit 803 transfers the image data that has undergone the color space conversion processing to the bus controller 113. The bus controller 113 which received the image data that has undergone the color space conversion processing transfers that data to the DRAM 116 or a device on each I/F.

<Image Conversion Unit>

The processing sequence in the image conversion unit 804 shown in FIG. 7 will be described below. The CPU 112 makes a setting for image conversion control in the bus controller 113. With this setting, the bus controller 113 makes a setting required for image conversion (an image size after conversion, etc.) in the image conversion unit 804. After completion of the required setting, the CPU 112 sends an image data transfer permission to the bus controller 113 again. According to this permission, the bus controller 113 begins to transfer image data from the DRAM 116 or a device connected via each I/F.

The image conversion unit 804 temporarily stores the received image data in the SRAM 136, and applies padding or clipping processing for the required number of pixels and the required number of lines according to a setting value, which is set in advance, to the stored image data using the SRAM 136 as an input buffer. This is an example of image size conversion processing. The data after image conversion is written back to the SRAM 136 again, and the image conversion unit 804 reads out the image data from the SRAM 136 using it as an output buffer and transfers the readout image data to the bus controller 113.

The bus controller 113 which received the image data that has undergone the padding or clipping processing transfers that data to the DRAM 116 or a device on each I/F.

<Image Binarization Unit>

The processing sequence in the image binarization unit 805 shown in FIG. 7 will be described below. The CPU 112 makes a setting for binarization control in the bus controller 113. With this setting, the bus controller 113 makes a setting required for binarization processing (various parameters according to a conversion method, etc.) in the image binarization unit 805. After completion of the required setting, the CPU 112 sends an image data transfer permission to the bus controller 113 again. According to this permission, the bus controller 113 begins to transfer image data from the DRAM 116 or a device connected via each I/F.

The image binarization unit 805 applies binarization processing to the received image data. In this embodiment, as a binarization method, image data is simply binarized by comparing it with a predetermined threshold. Of course, any other methods such as a dither method, error diffusion method, and improved error diffusion method may be used.

After that, the image binarization unit 805 transfers the image data that has undergone the binarization processing to the bus controller 113. The bus controller 113 which received the image data that has undergone the binarization processing transfers that data to the DRAM 116 or a device on each I/F.

<Image Multi-value Conversion Unit>

The processing sequence in an image multi-value conversion unit 806 shown in FIG. 7 will be described below. The CPU 112 makes a setting for image multi-value conversion control in the bus controller 113. With this setting, the bus controller 113 makes a setting required for image multi-value conversion (a color space after multi-value conversion, etc.) in the image multi-value conversion unit 806. After completion of the required setting, the CPU 112 sends an image data transfer permission to the bus controller 113 again. According to this permission, the bus controller 113 begins to transfer image data from the DRAM 116 or a device connected via each I/F.

The image multi-value conversion unit 806 temporarily stores the received image data in the SRAM 136, and converts the stored binary image data into a monochrome or color multi-valued image using the SRAM 136 as an input buffer. The data after multi-value conversion is written back to the SRAM 136 again, and the image multi-value conversion unit 806 reads out the image data from the SRAM 136 using it as an output buffer and transfers the readout image data to the bus controller 113.

The bus controller 113 which received the image data that has undergone the multi-value conversion processing transfers that data to the DRAM 116 or a device on each I/F.

<Image Composition Unit>

The processing sequence in an image composition unit 807 shown in FIG. 7 will be described below. The CPU 112 makes a setting for image composition control in the bus controller 113. With this setting, the bus controller 113 makes a setting required for image composition (a composition ratio, input and output color spaces, image sizes in the main scan and sub-scan directions, etc.) in the image composition unit 807. After completion of the required setting, the CPU 112 sends an image data transfer permission to the bus controller 113 again. According to this permission, the bus controller 113 begins to transfer image data from the DRAM 116 or a device connected via each I/F.

The image composition unit 807 temporarily stores received two image data in the SRAM 136, and applies composition processing to the two stored image data using the SRAM 136 as an input buffer.

As a composition method, let A and B be pixel values of pixels of interest of two input images. Then, a pixel value of an output image is calculated by an arithmetic method such as $(A \times B)/256$, $\{A \times \alpha + B \times (256-\alpha)\}/256$ (for $\alpha$: a composition ratio), or a method of acquiring a larger one of the pixel values A and B. Other arithmetic methods may be used. The image composition unit 807 has a function of generating $\alpha$, and can calculate $\alpha$ from pixel values of image data.

The data after composition is written back to the SRAM 136 again, and the image composition unit 807 reads out the image data from the SRAM 136 using it as an output buffer and transfers the readout image data to the bus controller 113.

The bus controller 113 which received the image data that has undergone the composition processing transfers that data to the DRAM 116 or a device on each I/F.

<Arrangement of Information Processing Apparatus>

Figure 8:
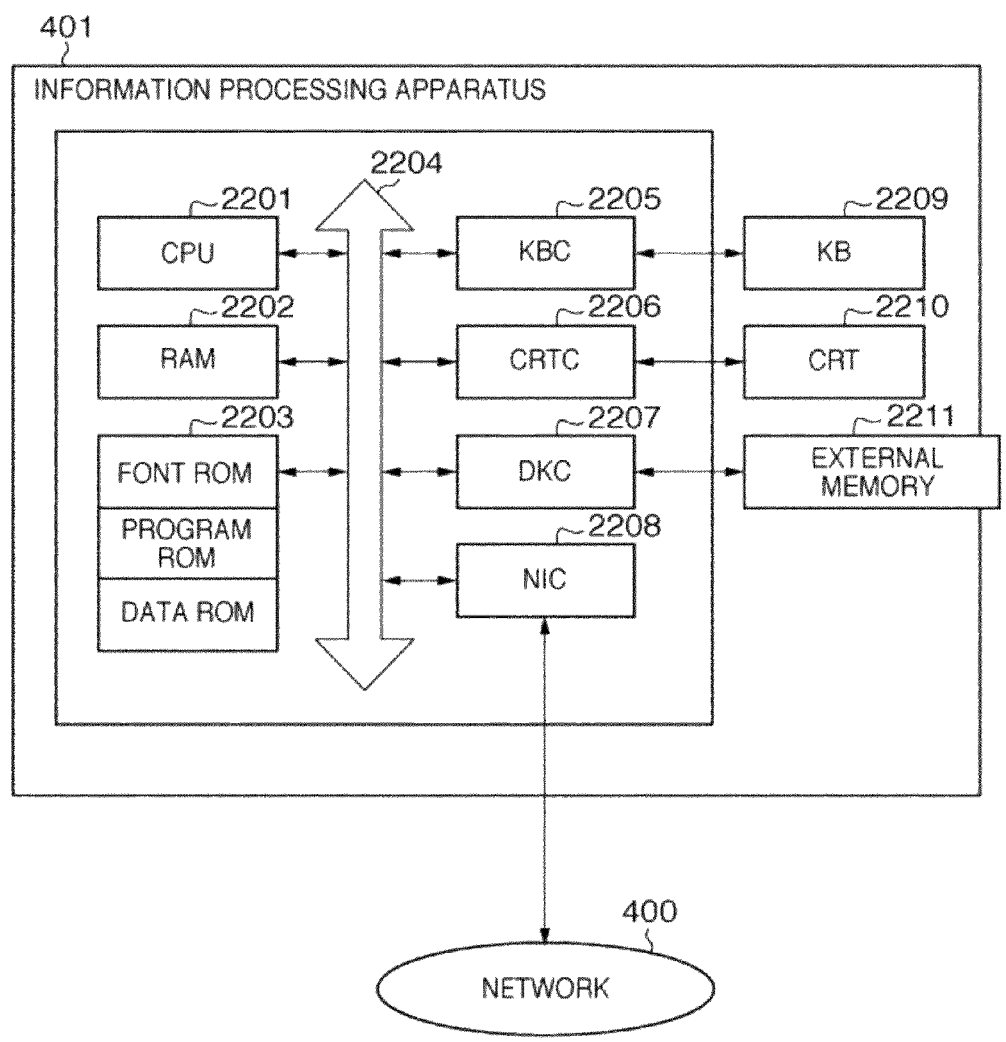
FIG. 8 is a block diagram showing the hardware arrangement of an information processing apparatus.

FIG. 8 is a block diagram showing the hardware arrangement of the information processing apparatus 401. The information processing apparatus 401 includes a CPU 2201, which controls execution of document processing and print processing based on that processing, according to a document processing program and the like stored in a program ROM of a ROM 2203 or an external memory 2211. Note that the document processing is processing for a document which includes graphics, images, text, and tables (including a spreadsheet, etc.), and includes processing in this embodiment. This CPU 2201 systematically controls devices connected to a system bus 2204. The program ROM of the ROM 2203 or the external memory 2211 stores an operating system program (to be referred to as an OS hereinafter) and the like as a control program of the CPU 2201. A font ROM of the ROM 2203 or the external memory 2211 stores font data and the like used in the document processing. Furthermore, a data ROM of the ROM 2203 or the external memory 2211 stores various data used upon execution of the document processing. A RAM 2202 serves as a main memory, work area, and the like of the CPU 2201.

A keyboard controller (KBC) 2205 controls key inputs form a keyboard 2209 and a pointing device (not shown). A CRT controller (CRTC) 2206 controls displays on a CRT display (CRT) 2210 including a display of a tint block pattern (a copy-forgery-inhibited pattern). A disk controller (DKC) 2207 controls accesses to the external memory 2211 such as a hard disk (HD) and floppy (registered trademark) disk (FD).

The hard disk (HD) stores a boot program, various applications, font data, user files, edit files, a printer control command generation program (to be referred to as a printer driver hereinafter), and the like. A network interface controller (NIC) 2208 is connected to the image processing apparatus 100 via the network 400, and executes communication control processing.

Note that the CPU 2201 opens various windows, which are registered in advance, and executes various data processes based on commands designated by, for example, a mouse cursor (not shown) on the CRT 2210. Upon execution of printing, the user opens a window associated with print settings, and can set a print processing method for the printer driver including printer settings and print mode selection.

Figure 9:
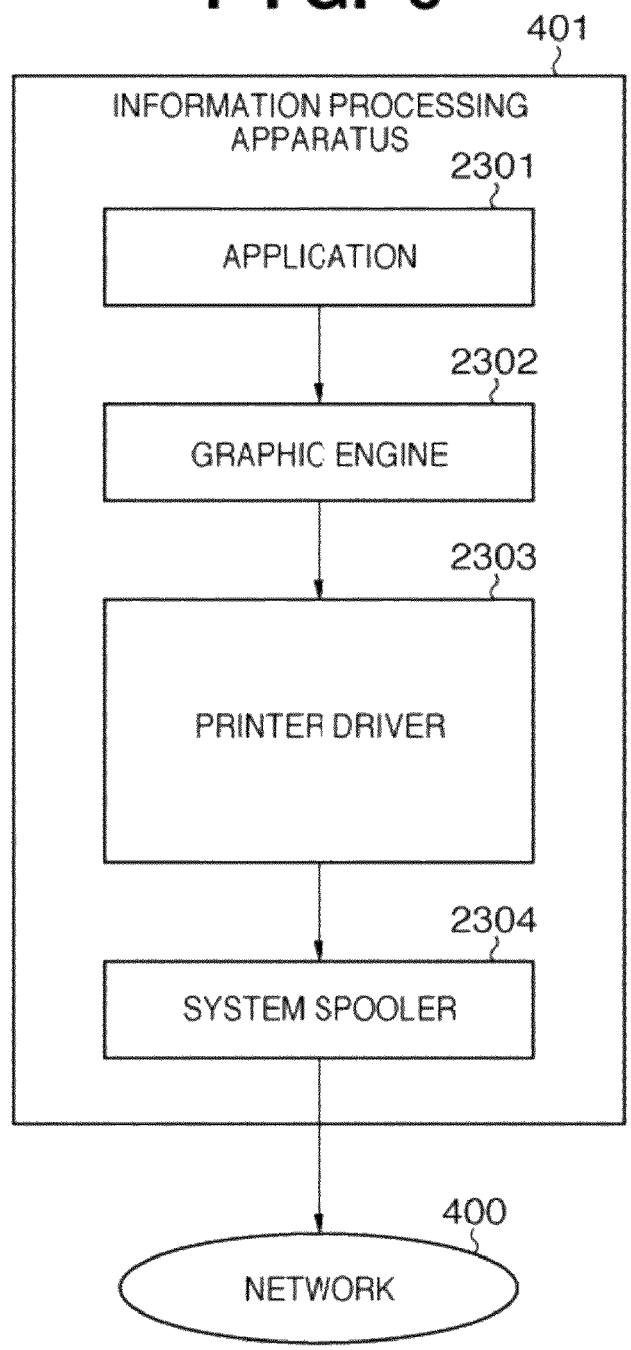
FIG. 9 is a block diagram showing the software configuration for print processing in the information processing apparatus.

FIG. 9 is a block diagram showing the software configuration for print processing in the information processing apparatus 401. An application 2301, graphic engine 2302, printer driver 2303, and system spooler 2304 exist as files saved in the external memory 2211. Also, they are program modules which are loaded onto the RAM 2202 and executed by the OS or a module which uses that of the OS.

The application 2301 and printer driver 2303 can be added to the HD of the external memory 2211 via the FD or a CD-ROM (not shown) of the external memory 2211 or the network 400. The application 2301 saved in the external memory 2211 is loaded onto the RAM 2202 when it is executed. When the application 2301 issues a print instruction of an image to the image processing apparatus 100, the image is output (rendered) using the graphic engine 2302, which has already been similarly loaded onto the RAM 2202, and is ready to run.

The graphic engine 2302 loads the printer driver 2303, which is prepared for each printer, from the external memory 2211 onto the RAM 2202, and sets an output destination of the application 2301 as the printer driver 2303. The graphic engine 2302 converts a GDI function received from the application 2301 into a DDI function, and outputs the DDI function to the printer driver 2303. Note that "GDI" is an abbreviation for "Graphic Device Interface", and "DDI" is an abbreviation for "Device Driver Interface". The printer driver 2303 converts, based on the DDI function received from the graphic engine 2302, the DDI function into control commands, PDL data, and the like, which can be detected by the image processing apparatus 100. The converted control commands are output as print data via the system spooler 2304, which is loaded onto the RAM 2202 by the OS.

<Sequence Upon Outputting PDL Image>

Figure 10:
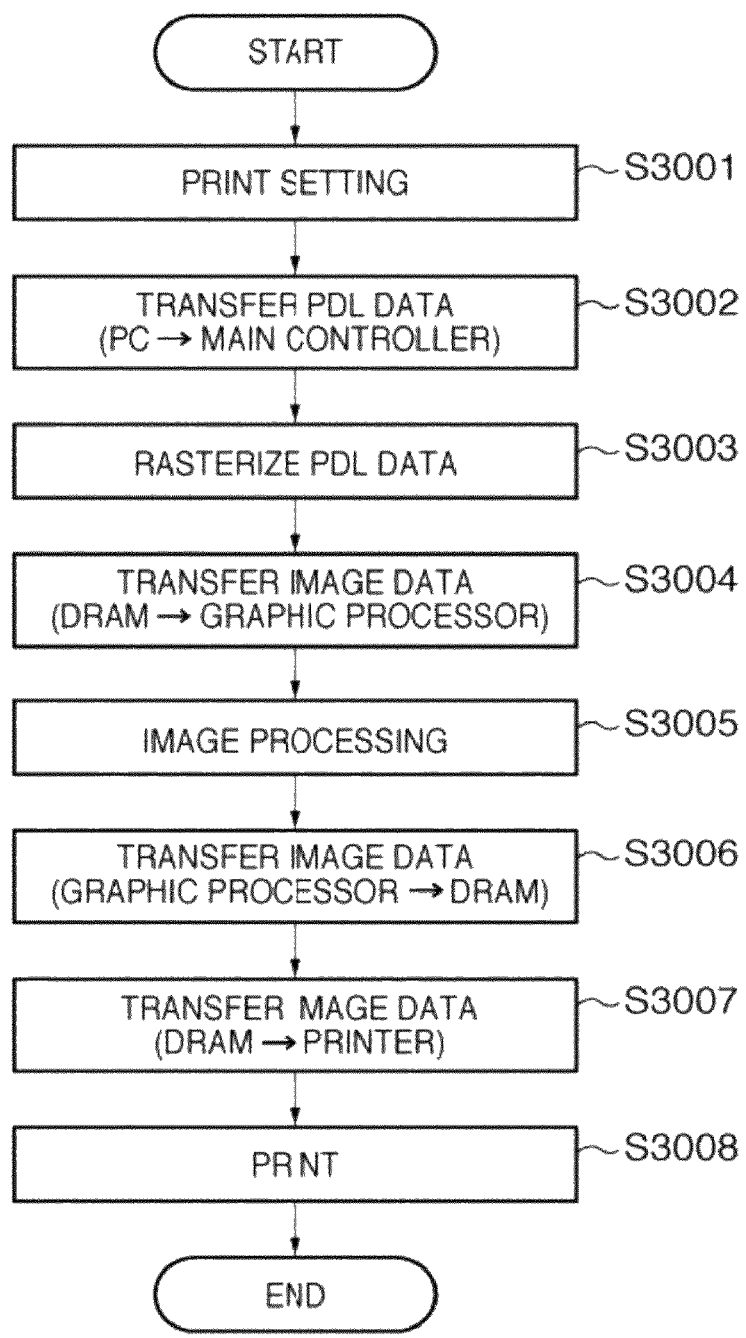
FIG. 10 is a flowchart showing a PDL image output sequence of the image processing apparatus.

FIG. 10 is a flowchart showing the PDL image output sequence of the image processing apparatus 100. Note that S3001 to S3008 in FIG. 10 represent respective steps. Also, assume that this flowchart is executed by the CPU 2201 in the information processing apparatus 401 shown in FIG. 1 and the CPU 112 shown in FIG. 4 based on a program stored in a storage medium.

When a PDL image is output, the user makes print settings of the PDL image output job on the information processing apparatus 401 in step S3001. The print setting contents include the number of copies, a paper size, a single-sided/booklet print mode, a page output order, a sort output mode, the presence/absence of security dots, and so forth.

In step S3002, the user inputs a print instruction on the information processing apparatus 401. The printer driver installed on the information processing apparatus 401 converts code data to be printed on the information processing apparatus 401 into so-called PDL data. The converted PDL data is transferred to the control unit 110 of the image processing apparatus 100 via the network 400 together with the print setting parameters set in step S3001.

In step S3003, the CPU 112 in the main controller 111 of the control unit 110 rasterizes the PDL data transferred via the connector 122 and network controller 121 to image data based on the print setting parameters. The image data is rasterized on the DRAM 116. Upon completion of rasterization of the image data, the process advances to step S3004.

In step S3004, the main controller 111 transfers the image data rasterized on the DRAM 116 to the graphic processor 135.

In step S3005, the graphic processor 135 executes image processing independently of the print setting parameters. For example, assume that the paper cassette 360 of the printer unit 300 stores only A4R paper sheets although the paper size designated by the print setting parameters is A4. In this case, the graphic processor 135 rotates an image through 90° to output an image that matches an output paper sheet. Upon completion of the image processing of the image data, the process advances to step S3006.

In step S3006, the graphic processor 135 transfers the image data after the image processing to the main controller 111. The main controller 111 stores the transferred image data on the DRAM 116.

In step S3007, the main controller 111 transfers the image data on the DRAM 116 to the printer unit 300 at appropriate timings while controlling the printer unit 300 via the printer I/F 145 and connector 147.

In step S3008, the control unit 110 controls the printer unit 300 to print out the image data. If transfer of the image data is complete, that is, the PDL job ends, the printout processing ends.

<Sequence Upon Outputting Copy Image>

Figure 11:
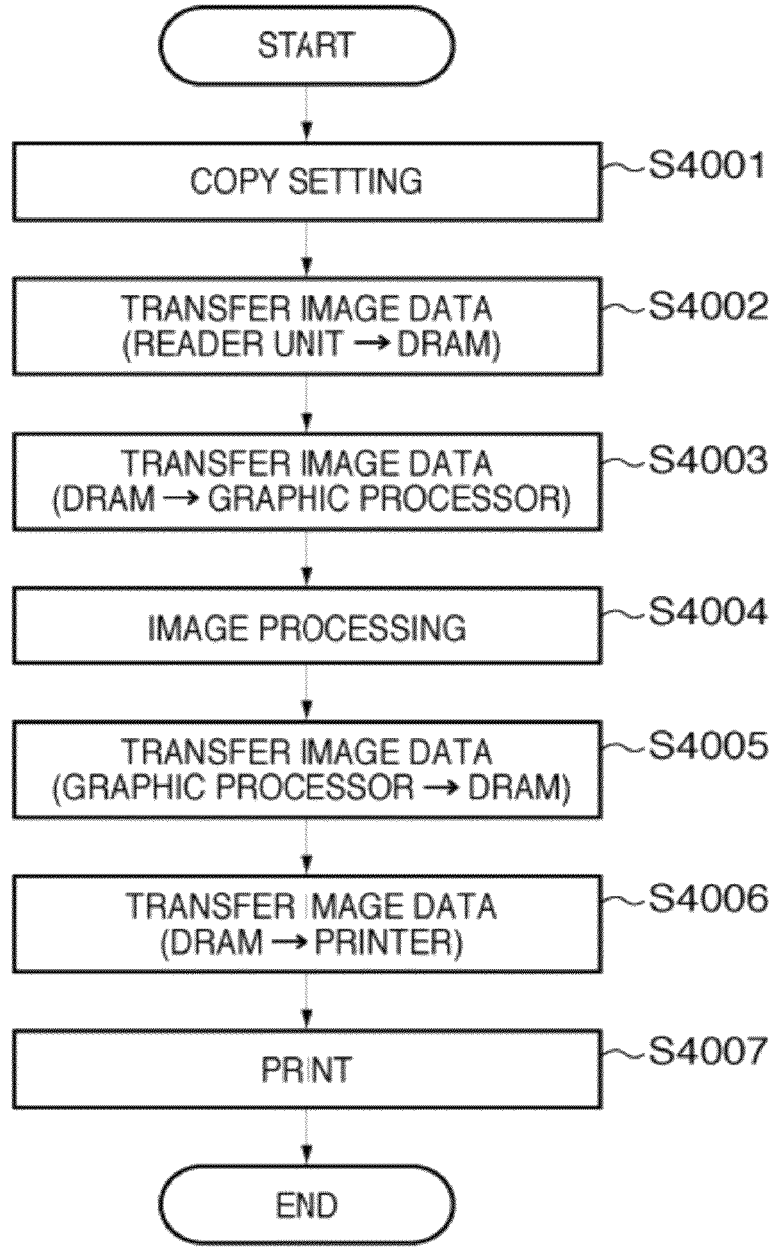
FIG. 11 is a flowchart showing a copy image output sequence of the image processing apparatus.

FIG. 11 is a flowchart showing the copy image output sequence of the image processing apparatus 100. Note that S4001 to S4007 in FIG. 11 represent respective steps. Also, assume that this flowchart is executed by the CPU 112 shown in FIG. 4 based on a program stored in a storage medium.

When a copy image is output, the user makes copy settings of a copy image output job on the operation unit 150 in step S4001. The copy setting contents include the number of copies, a paper size, a single-sided/booklet print mode, an enlargement/reduction scale, a sort output mode, the presence/absence of stapling, and so forth.

In step S4002, if the user inputs a copy start instruction on the operation unit 150, the main controller 111 of the control unit 110 controls the reader unit 200 via the scanner I/F 140 and connector 142 to read image data of a document. The image data is stored on the DRAM 116.

The conventional copying machine realizes scaling processing in the sub-scan direction by changing the moving speed of the optical unit 213 according to the enlargement/reduction scale set in the copy settings, that is, according to the scale in the sub-scan direction. However, in this embodiment, assume that image data is read at an equal size (100%) irrespective of the enlargement/reduction scale set in the copy settings, and the graphic processor 135 executes the scaling processing in both the main scan and sub-scan directions, as will be described later.

In step S4003, the main controller 111 transfers the image data on the DRAM 116 to the graphic processor 135. In step S4004, the graphic processor 135 executes image processing based on the copy setting parameters. For example, when an enlargement scale=400% is set, the scaling processing in one or both of the main scan direction and sub-scan direction is executed using the image scaling unit as a module in the graphic processor 135. Upon completion of the image processing of the image data, the process advances to step S4005.

In step S4005, the graphic processor 135 transfers the image data after the image processing to the main controller 111. The main controller 111 stores the transferred image data on the DRAM 116.

In step S4006, the main controller 111 transfers the image data on the DRAM 116 to the printer unit 300 at appropriate timings while controlling the printer unit 300 via the printer I/F 145 and connector 147.

Furthermore, in step S4007 the control unit 110 controls the printer unit 300 to print out the image data. If transfer of the image data is complete, that is, the copy job ends, the printout processing ends.

<Operation Unit>

Figure 12:
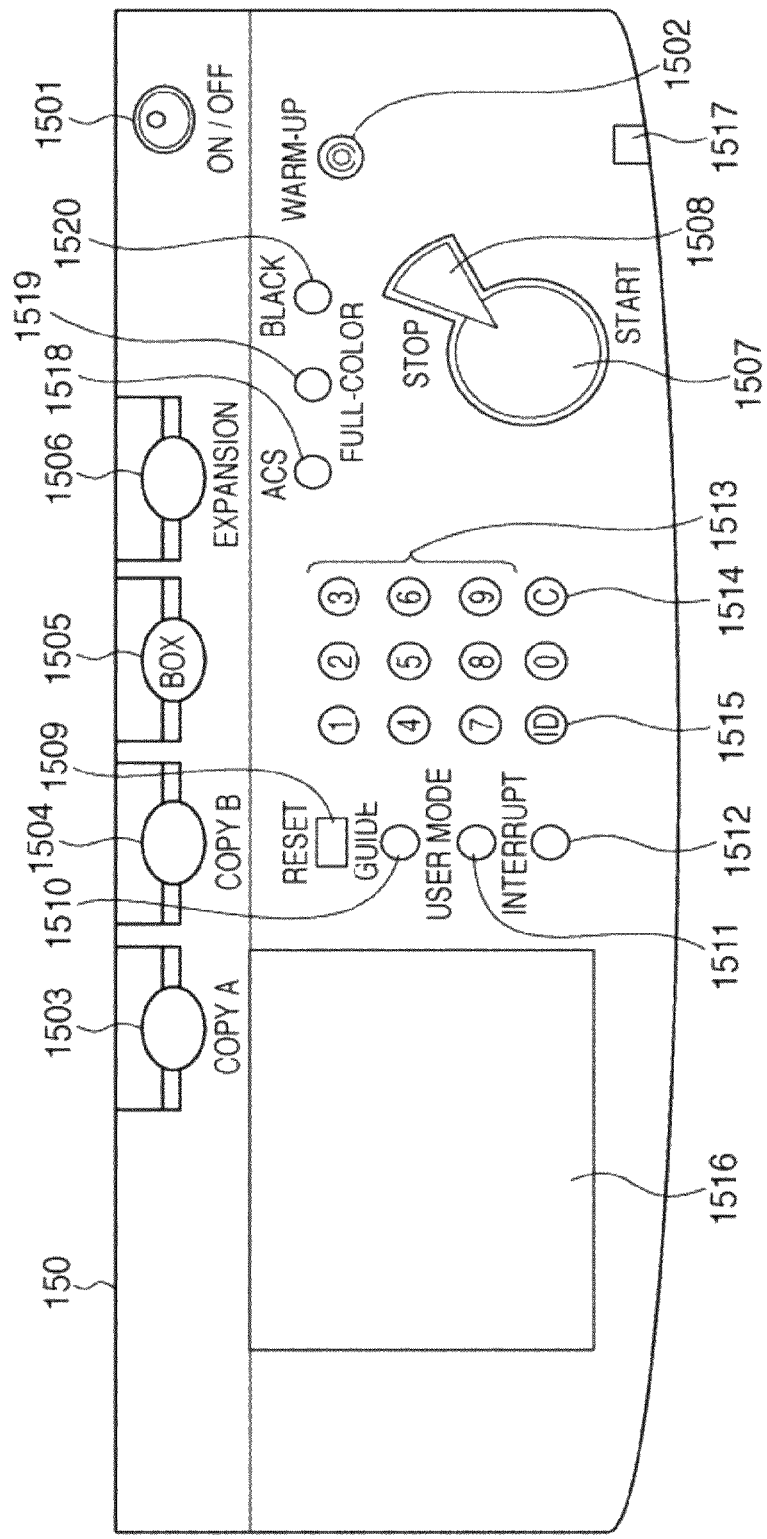
FIG. 12 is a view showing a key layout on an operation unit shown in FIG. 1.

FIG. 12 is a plan view showing a key layout on the operation unit 150 shown in FIG. 1. Referring to FIG. 12, a power switch 1501 controls energization to the main body. A warm-up key 1502 is used to turn on/off a warm-up mode. A copy A mode key 1503 is used to select a copy A mode from a plurality of functions. A copy B mode key 1504 is used to select a copy B mode from a plurality of functions. The copy A and copy B modes are identical copy functions, but since a next copy job can be input when the scanner reading operation of one copy job is completed, two copy mode keys are independently arranged to allow the user to easily understand such functions.

A box key 1505 is used to select a box mode from a plurality of functions. The box function has a storage area in the copying machine for each individual user or department, in which PDL or scan image data is stored and is output at a favorite timing.

An expansion key 1506 is used to make operations for PDL data. The aforementioned copy A mode key 1503 to the expansion key 1506 are also used to call respective function screens of an LCD 1516 to be described later, and the user can confirm respective job statuses displayed on the LCD 1516.

A copy start key 1507 is used to input a copy start instruction. A stop key 1508 is used to interrupt or cancel a copy job. A reset key 1509 serves as a key to resume a standard mode during a standby state.

A guide key 1510 is used when the user wants to know respective functions. A user mode key 1511 is used when the user changes default settings of the system. An interrupt key 1512 is used to execute another copy job by interrupting a copy job which is in progress. A numeric key pad 1513 is used to input a numerical value.

A clear key 1514 is used to clear a numerical value. An ID key 1515 is used to transit to an ID input mode when the user uses the copying machine. The LCD 1516 including a combination of a liquid crystal panel and touch sensor displays an individual setting screen for each mode, and allows making various detailed settings by touching displayed keys. The LCD 1516 also displays operation statuses of respective jobs.

A tally lamp 1517 indicating a communication state of the network normally lights in green, flickers in green during a communication, and lights in red in case of a network error.

An ACS key 1518 is used to automatically determine if a copy document is color or monochrome, and sets a color scan mode for a color document or a monochrome scan mode for a monochrome document. ACS means "Auto Color Select". A full-color mode key 1519 is used when a full-color scan mode is set irrespective of a copy document. A black mode key 1520 is used to set a scan mode using a single black color irrespective of a copy document. The ACS key 1518 to the black mode key 1520 are toggled to always select one of these keys, and an indicator corresponding to the selected key is turned on.

<Hard Disk Area>

Figure 13:
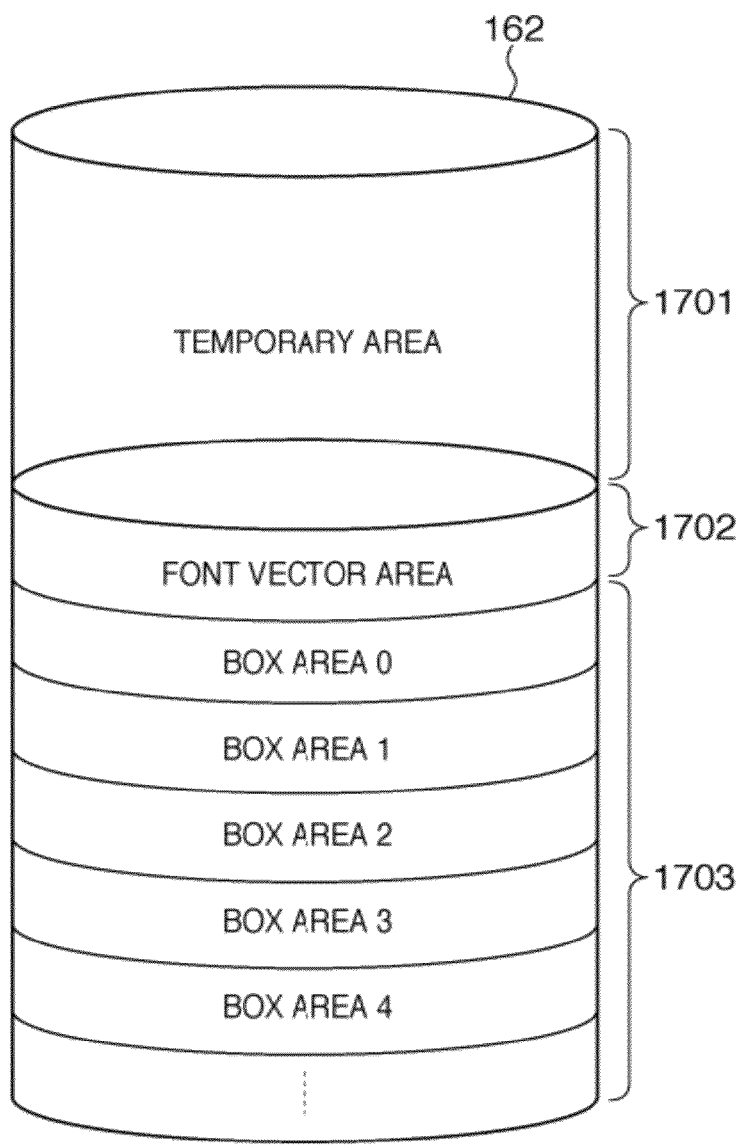
FIG. 13 is a view showing the memory configuration of a hard disk.

FIG. 13 is a conceptual view of the hard disk (HD) 162. The hard disk 162 includes a temporary area 1701, font vector area 1702, and box area 1703. The temporary area 1701 temporarily stores image data so as to attain digital sorting, and these image data are erased after a job ends. The font vector area 1702 stores font vector data required to generate a character part used when the image processing apparatus 100 appends a tint block pattern to a copy or box document, and outputs that document.

The box area 1703 stores image data obtained by rasterizing PDL image data from the information processing apparatus 401 and image data input from the scanner.

<Box Registration Sequence>

FIGS. 14A and 14B are flowcharts showing the box registration sequence of the image processing apparatus 100. Note that the box registration of this embodiment includes that of PDL image data from the information processing apparatus 401 and that of scan image data from the scanner. FIG. 14A corresponds to the box registration sequence of PDL image data from the information processing apparatus 401 shown in FIG. 1, and FIG. 14B corresponds to that of scan image data from the scanner (reader unit 200 shown in FIG. 1). Note that S1801 to S1809 in FIGS. 14A and 14B represent respective steps.

The flowchart of FIG. 14A is executed by the CPU 2201 in the information processing apparatus 401 shown in FIG. 1, and the CPU 112 shown in FIG. 4 based on a program stored in a storage medium. Also, the flowchart of FIG. 14B is executed by the CPU 112 shown in FIG. 4 based on a program stored in a storage medium.

A case will be described first with reference to FIG. 14A wherein PDL image data from the information processing apparatus 401 shown in FIG. 1 is to be registered in a box area.

In step S1801, the user makes print settings on the information processing apparatus 401, and the process advances to step S1802. The print setting contents include the number of copies, a paper size, an enlargement/reduction scale, a single-sided/booklet print mode, a page output order, a sort output mode, the presence/absence of stapling, and so forth.

In step S1802, the user sets a box number on the information processing apparatus 401 to designate an area in the box area 1703 of the hard disk 162, and the process advances to step S1803. For example, when the user designates a box number=1, a personal box area "1" in the box area 1703 is designated.

In step S1803, the user inputs a print instruction on the information processing apparatus 401, and the printer driver installed on the information processing apparatus 401 converts code data to be printed into so-called PDL data. Furthermore, the PDL data is transferred to the control unit 110 of the image processing apparatus 100 together with the print setting parameters set in step S1801, and the process advances to step S1804.

In step S1804, the transferred PDL data is rasterized into image data. Upon completion of rasterization of the image data, the process advances to step S1805. In step S1805, the rasterized image data is sequentially recorded in the box area 1703 of the hard disk 162, and is stored in the box area "1" when the box number designated in step S1802 is, for example, "1". At this time, the print setting parameters set in step S1801 are also recorded in the box area 1703. When the box number designated in step S1802 is "2" or "3", the image data and print setting parameters are stored in an area "2" or "3".

A case will be described below with reference to FIG. 14B wherein scan image data from the reader unit 200 shown in FIG. 1 is registered in a box area. In step S1806, the user designates a box number required to input image data from the operation unit 150, and the process advances to step S1807.

In step S1807, the user designates scan settings of image processing and the like on the operation unit 150, and the process advances to step S1808.

In step S1808, when the user inputs a scan start instruction (for example, he or she presses the copy start key 1507 shown in FIG. 12), the reader unit 200 reads a document image, and the process advances to step S1809. In step S1809, the image data read in step S1808 is stored in a box area designated in step S1806.

<Tint Block Pattern Print Setting>

Figure 15:
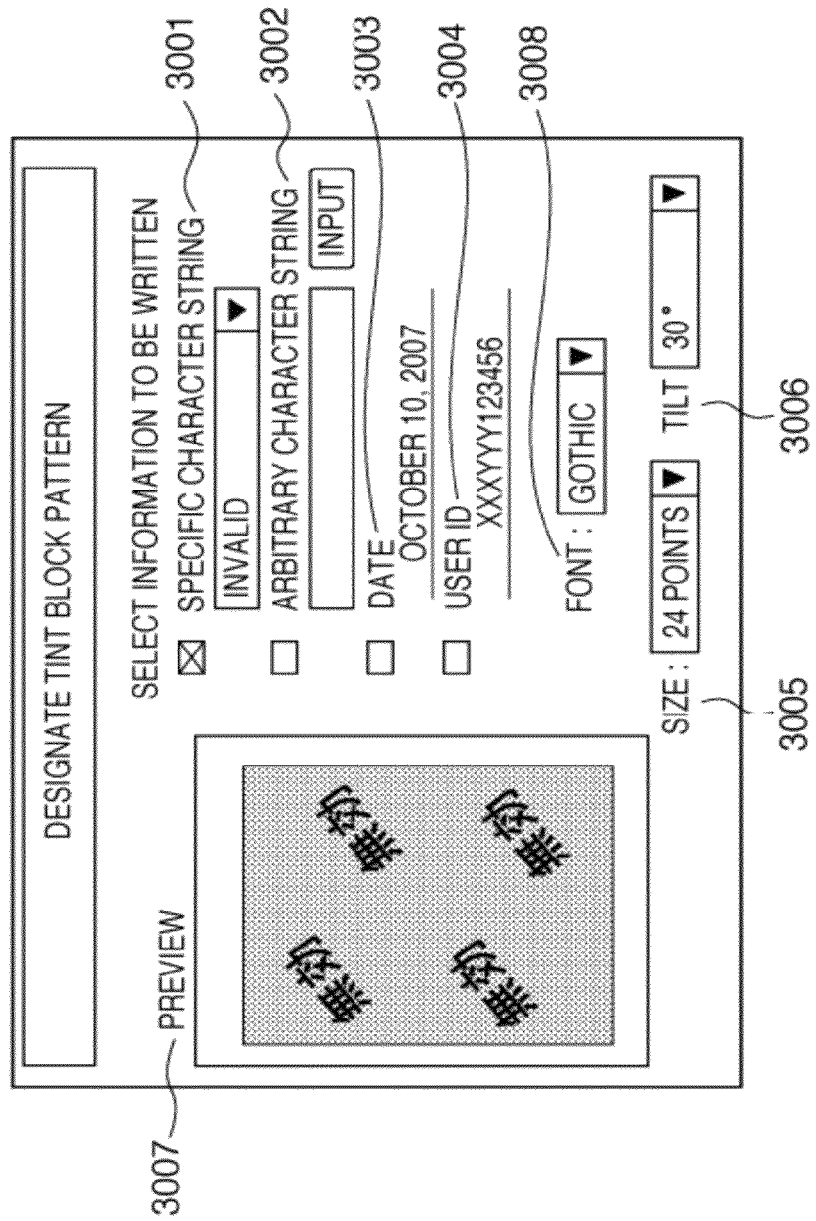
FIG. 15 is a view showing an example of a user interface used to make settings about tint block pattern printing.

FIG. 15 is a view showing an example of a user interface used to make settings about tint block pattern printing. A tint block pattern and LVBC (to be described later) are known as dot patterns (dot images) processed to prevent any information leakage. A tint block pattern includes a latent image which is visually recognizable on a copied material, and is used to suppress any information leakage, and a background image. Assume that the user interface in FIG. 15 is displayed on the printer driver screen of the information processing apparatus 401 or the operation unit screen of the image processing apparatus 100. The user can set displayed items 3001 to 3006, and 3008, and the items 3001 to 3004 are designed to select whether or not to output using corresponding check boxes. In FIG. 15, the item 3001 is set to be "output". The item 3001 allows the user to select a character string "Invalid", "Confidential", or "Copy Inhibited" from a pull-down menu when a predetermined character string is to be output.

The item 3002 allows the user to designate arbitrary characters. When the user presses an input button on the right end of the item 3002, a software keyboard is displayed to allow the user to input arbitrary characters, and the input characters are displayed on a text box. The item 3003 is checked when the user wants to output a date of operation, and the date is automatically displayed based on an internal clock of the apparatus. The item 3004 is checked when the user wants to output a user ID of himself or herself who uses the apparatus, and an ID code input when he or she logs in the apparatus is automatically displayed. The items 3005, 3006, and 3008 are used to designate an output format, and they allow the user to designate a font, size, and tilt of a character string using corresponding pull-down menus.

The user can confirm a tint block pattern output result to be actually output onto a paper sheet according to the items set on the above user interface on a preview window 3007 on the left side. When at least one of the check boxes of the items 3001 to 3004 is set to be "output", attribute data as a setting parameter indicates "tint block pattern included".

<LVBC Print Processing>

Figure 16:
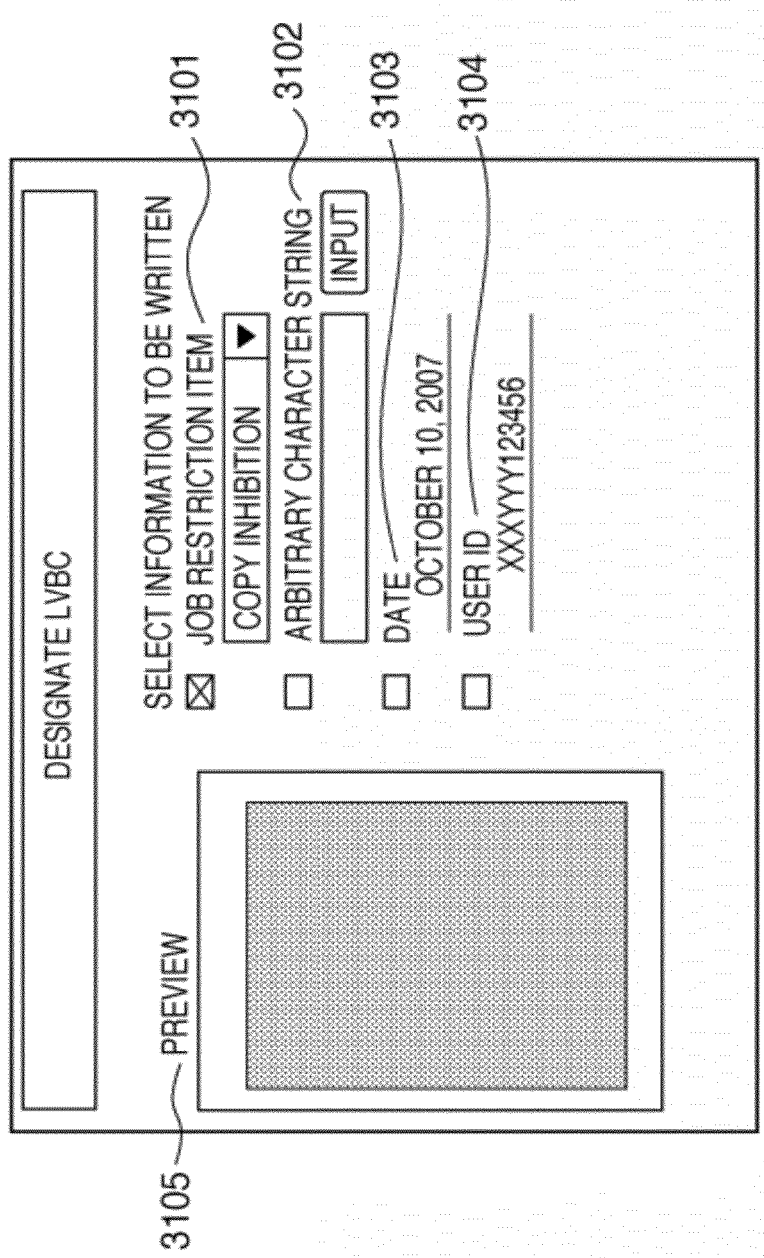
FIG. 16 is a view showing an example of a user interface used to make settings about LVBC printing.

FIG. 16 is a view showing an example of a user interface used to make settings for LVBC printing. Assume that the user interface in FIG. 16 is displayed on the printer driver screen of the information processing apparatus 401 or the operation unit screen of the image processing apparatus 100. The user can set displayed items 3101 to 3104, and the items 3101 to 3104 are designed to select whether or not to output using corresponding check boxes. In FIG. 16, the item 3101 is set to be "output". The item 3101 allows the user to set a job restriction, and he or she can select a job restriction such as copy inhibition. An output material embedded with this LVBC information is inhibited from being copied. The item 3102 allows the user to designate arbitrary characters. When the user presses an input button on the right end of the item 3102, a software keyboard is displayed to allow the user to input arbitrary characters, and the input characters are displayed on a text box. The item 3103 is checked when the user wants to output a date of operation, and the date is automatically displayed based on an internal clock of the apparatus. The item 3104 is checked when the user wants to output a user ID of himself or herself who uses the apparatus, and an ID code input when he or she logs in the apparatus is automatically displayed.

The user can confirm an LVBC output result to be actually output onto a paper sheet according to the items set on the above user interface on a preview window 3105 on the left side. When at least one of the check boxes of the items 3101 to 3104 is set to be "output", attribute data as a setting parameter indicates "LVBC included".

<Tint Block Pattern Generation Processing>

Figure 17:
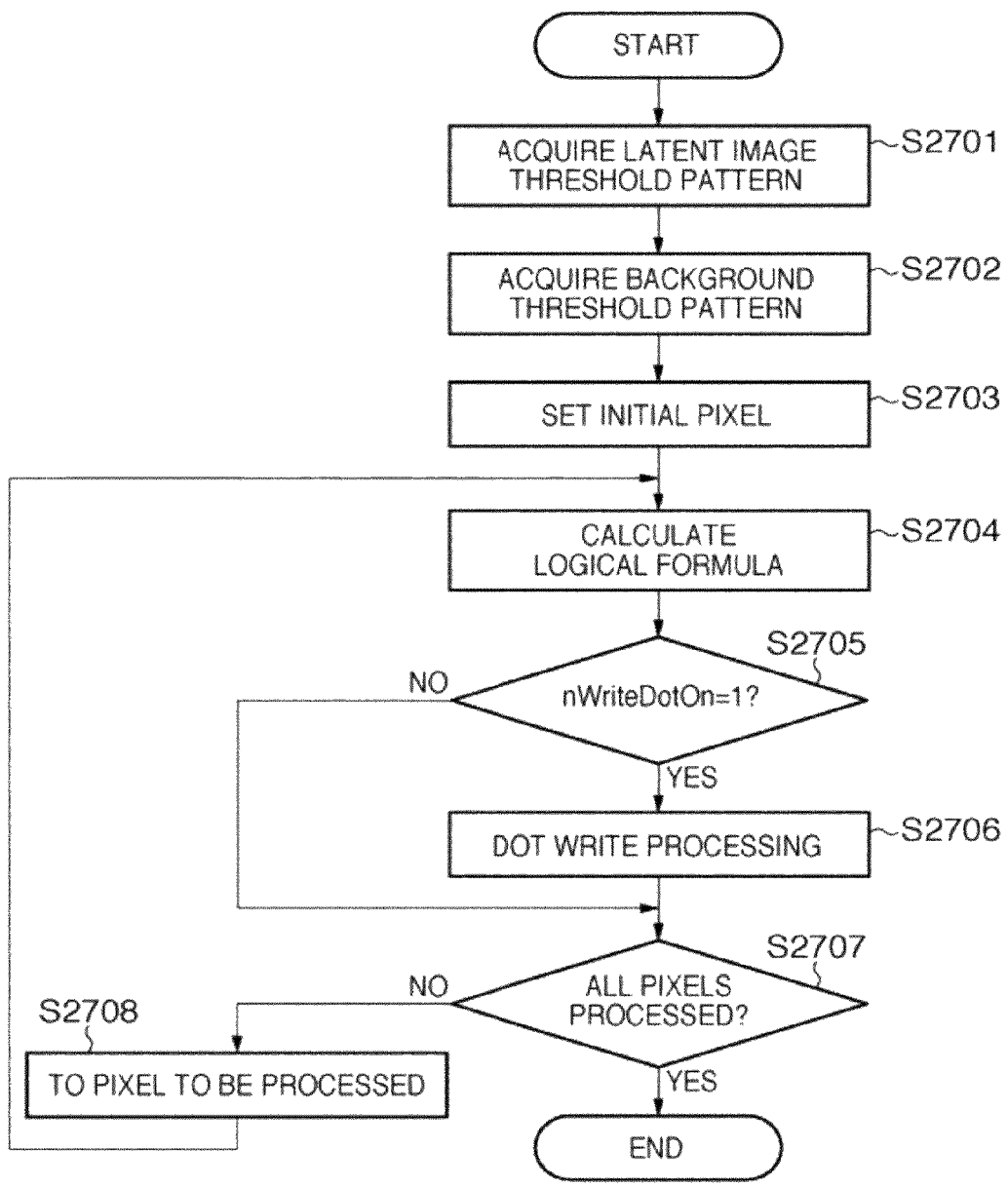
FIG. 17 is a flowchart showing details of the sequence of tint block pattern generation processing.

FIG. 17 is a flowchart showing details of the sequence of tint block pattern generation processing. The tint block pattern generation processing will be described below with reference to FIG. 17. This tint block pattern generation processing is executed by the CPU 2201 of the information processing apparatus 401 or the CPU 112 of the image processing apparatus 100. When a tint block pattern is generated inside the information processing apparatus 401, and the tint block pattern itself is transmitted to the image processing apparatus 100, this tint block pattern generation processing is executed by the CPU 2201 of the information processing apparatus 401. However, when only information associated with a tint block pattern set by the printer driver is transmitted to the image processing apparatus 100, and the image processing apparatus 100 generates a tint block pattern based on that information, this tint block pattern generation processing is executed by the CPU 112 of the image processing apparatus 100. Also, when a copy image with a tint block pattern is to be output or a box document with a tint block pattern is to be registered in the image processing apparatus 100, this tint block pattern generation processing is also executed by the CPU 112 of the image processing apparatus 100. In this case, assume that the CPU 2201 of the information processing apparatus 401 executes the tint block pattern generation processing.

In step S2701, the CPU 2201 acquires a latent image threshold pattern required to render security dots of a tint block pattern. In step S2702, the CPU 2201 acquires a background threshold pattern required to render the security dots of the tint block pattern. Furthermore, in step S2703 the CPU 2201 decides an initial pixel upon generation of a security dot image of the tint block pattern. In this case, assume that an upper left pixel is decided as an initial pixel.

In step S2704, the CPU 2201 executes calculations based on formula (1) below for respective pixels based on the background threshold pattern and latent image threshold pattern. Based on the calculation result, the CPU 2201 determines whether or not to write pixel values corresponding to dots to be printed in a memory area.

Note that the background threshold pattern and latent image threshold pattern are pattern data including "1" and "0" corresponding to dots to be written/not to be written. These pattern data are patterned using dither matrices suited to generate a latent image and background image.

$$n\text{WriteDotOn} = n\text{SmallDotOn} \times \neg n\text{HiddenMark} + n\text{LargeDotOn} \times n\text{HiddenMark} \quad (1)$$

Note that definitions of respective elements of this formula will be described below.

"nSmallDotOn" assumes 1 if a pixel value of the background threshold pattern is black or 0 if it is white. "nLargeDotOn" assumes 1 if a pixel value of the latent image threshold pattern is black or 0 if it is white. "nHiddenMark" assumes 1 if a pixel of interest corresponds to a latent image region in a latent image/background region designation image or 0 if it corresponds to a background region. "¬nHiddenMark" is a negation of "nHiddenMark", and assumes 0 for a latent image region or 1 for a background region.

In the tint block pattern to be generated, an image having a size defined by least common multiples of the lengths and widths of the background threshold pattern and latent image threshold pattern is used as a minimum unit of repetition. Hence, only a part of the tint block pattern as the minimum unit of repetition is generated first. Then, the part of the tint block pattern is repetitively placed in a tile pattern to match the size of an image to be generated. In this way, the processing time required for tint block pattern generation can be shortened.

In step S2705, the CPU 2201 determines the calculation result ("nWriteDotOn" value) in step S2704. That is, if nWriteDotOn=1, the process advances to step S2706; if nWriteDotOn=0, the process jumps to step S2707.

In step S2706, the CPU 2201 executes processing for setting a pixel value corresponding to a dot to be printed. Note that the pixel value can be changed depending on a tint block pattern color. When a black tint block pattern is to be generated, a pixel to be processed of the tint block pattern is set to be black.

The CPU 2201 determines in step S2707 if all the pixels of the region to be processed have been processed. If all the pixels of the region to be processed have not been processed yet, the process advances to step S2708 to select a pixel to be processed, and to execute the processes in steps S2704 to S2706 again. If all the pixels of the region to be processed have been processed, the tint block pattern generation processing ends.

Figure 18:
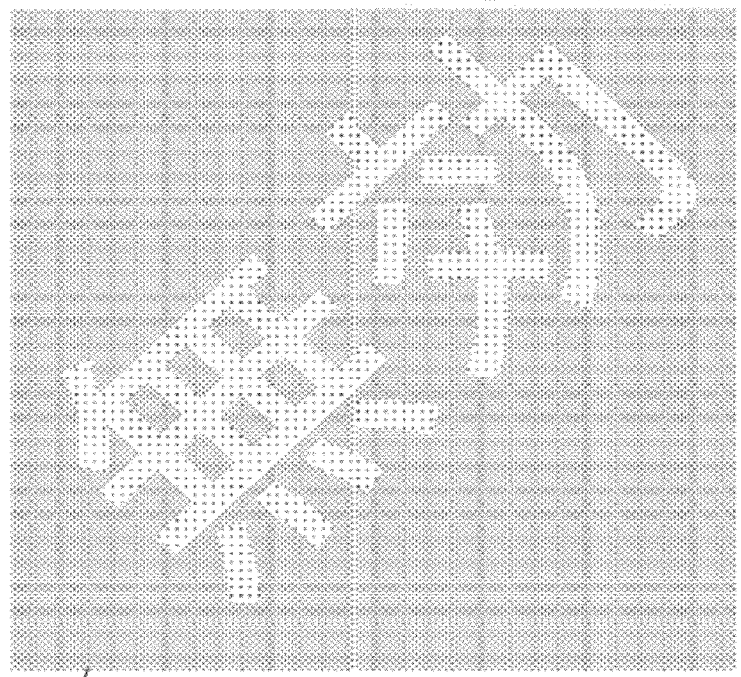
FIG. 18 is a view showing an example of a tint block pattern image used in this embodiment.

With the above processing, a tint block pattern can be generated. However, in the tint block pattern obtained only via the aforementioned processing, since a dot cluster may be generated at a boundary between a latent image and background in the latent image/background region designation image, and an outline of the latent image stands out, a demerit of reducing the effect of the anti-forgery tint block pattern may be posed. Hence, processing (boundary processing) for preventing a dot cluster from being generated at a boundary between a latent image and background in the latent image/background region designation image may be executed together. With the above processing, a tint block pattern 2101 shown in FIG. 18 is generated. The generated tint block pattern is held together with image data.

<LVBC Generation Processing>

The LVBC generation processing is executed by the CPU 2201 of the information processing apparatus 401 or the CPU 112 of the image processing apparatus 100. When LVBC data is generated by the information processing apparatus 401, and the LVBC data itself is transmitted to the image processing apparatus 100, this LVBC generation processing is executed by the CPU 2201 of the information processing apparatus 401. However, when only information associated with LVBC data set by the printer driver is transmitted, and the image processing apparatus 100 generates LVBC data based on that information, this LVBC generation processing is executed by the CPU 112 of the image processing apparatus 100. Also, when a copy image with LVBC data is to be output or a box document with LVBC data is to be registered in the image processing apparatus 100, this LVBC generation processing is executed by the CPU 112 of the image processing apparatus 100. In this case, assume that the CPU 2201 of the information processing apparatus 401 executes the LVBC generation processing.

Figure 19:
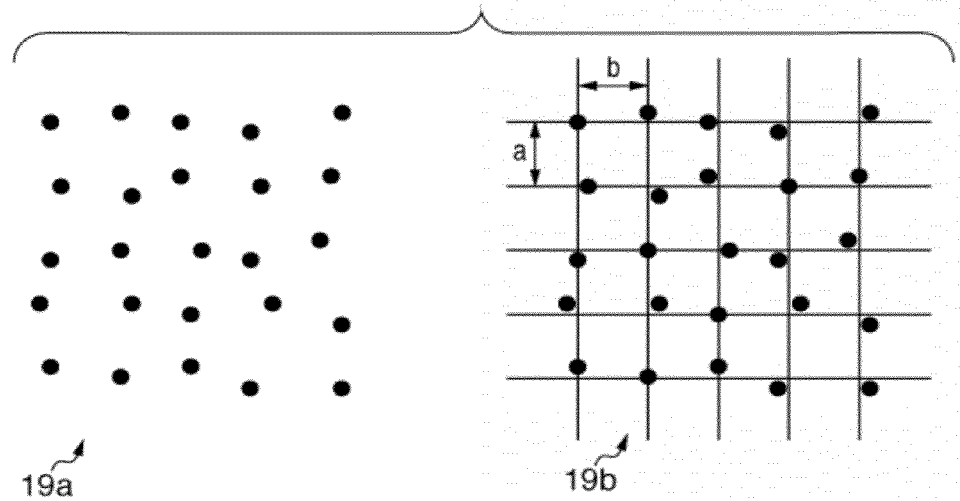
FIG. 19 is a view for explaining generation of an LVBC image.

In order to generate LVBC data 19*a* shown in FIG. 19, displacement amounts of dot coordinates are calculated from the positions of virtual grids 19*b* shown in FIG. 19, which are defined by intervals a and b, and data set from the user interface shown in FIG. 16.

In general, LVBC data is known as an example of two-dimensional code information to be two-dimensionally embedded in image information. Embedding of information in LVBC data will be described below. In LVBC data, a grid (lattice) required to embed additional information is prepared in addition to an image to be printed. FIG. 19 shows such a grid 19*b*. The grid is a lattice of uniformly spaced horizontal and perpendicular lines. As indicated in 19*b* of FIG. 19, one dot is placed to have a certain displacement. This displacement indicates additional information set as binary data. For example, the additional information is embedded by displacing it (deviating it from the center) in one of eight, upper, lower, right, and left directions with respect to a grid. An image embedded with the additional information will also be referred to as an LVBC image hereinafter.

The data set on the user interface shown in FIG. 16 is converted into a displacement amount, and a dot is printed based on that displacement amount, thus generating LVBC data. By repetitively placing the generated LVBC data on the entire page, the LVBC data 19*a* shown in FIG. 19 is generated. The generated LVBC data is held together with image data.

<Security Dot Control Processing>

Figure 20A:
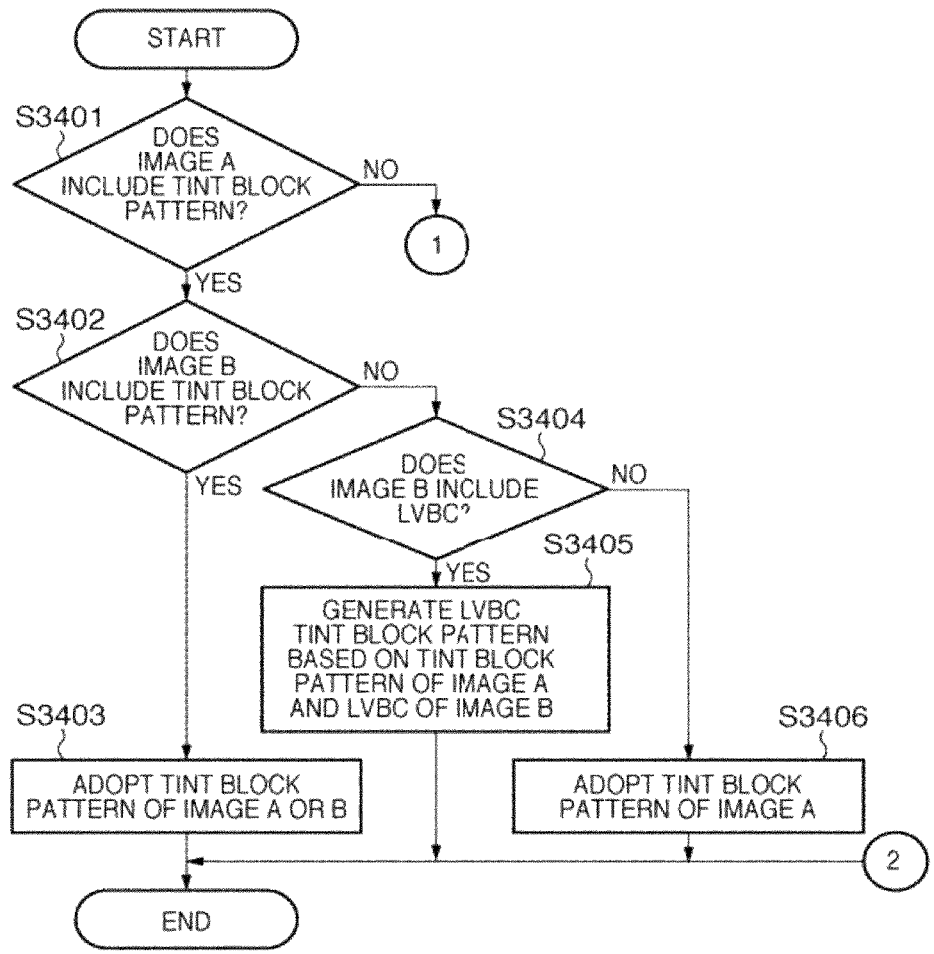
FIG. 20A is a flowchart showing details of security dot control processing upon compositing images A and B in this embodiment.

FIGS. 20A and 20B are flowcharts showing details of security dot control processing upon compositing images A and B in this embodiment. The security dot control processing will be described below with reference to FIGS. 20A and 20B.

The security dot control processing is executed by the CPU 112 of the image processing apparatus 100. The CPU 112 determines in step S3401 if image A holds a tint block pattern.

As a determination method, the CPU 112 refers to attribute data of image data, and if the attribute data indicates "tint block pattern included", the CPU 112 determines that the image holds a tint block pattern. If it is determined in step S3401 that image A holds the tint block pattern, the CPU 112 determines in step S3402 if image B holds a tint block pattern. The process in step S3401 is an example of a first determination unit of this embodiment.

If it is determined in step S3402 that image B holds the tint block pattern, the CPU 112 adopts the tint block pattern of either one of images A and B as security dots after image composition in accordance with user's settings in step S3403. If it is determined in step S3402 that image B does not hold any tint block pattern, the CPU 112 determines in step S3404 if image B holds LVBC data.

As a determination method, the CPU 112 refers to attribute data of image data, and if the attribute data indicates "LVBC included", the CPU 112 determines that the image holds LVBC data. If it is determined in step S3404 that image B holds LVBC data, the CPU 112 generates an LVBC tint block pattern based on the tint block pattern of image A and the LVBC data of image B in step S3405. The process in step S3404 is an example of a second determination unit of this embodiment. If it is determined in step S3404 that image B does not hold any LVBC data, the CPU 112 adopts the tint block pattern of image A as security dots after image composition in step S3406.

On the other hand, if it is determined in step S3401 that image A does not hold any tint block pattern, the CPU 112 determines in step S3407 if image A holds LVBC data. If it is determined in step S3407 that image A holds LVBC data, the CPU 112 determines in step S3408 if image B holds a tint block pattern. If it is determined in step S3408 that image B holds the tint block pattern, the CPU 112 generates an LVBC tint block pattern based on the LVBC data of image A and the tint block pattern of image B in step S3409.

If it is determined in step S3408 that image B does not hold any tint block pattern, the CPU 112 determines in step S3410 if image B holds LVBC data. If it is determined in step S3410 that image B holds the LVBC data, the CPU 112 adopts the LVBC data of either one of images A and B as security dots after image composition in accordance with user's settings in step S3411.

If it is determined in step S3410 that image B does not hold any LVBC data, the CPU 112 adopts the LVBC data of image A as security dots after image composition in step S3412.

On the other hand, if it is determined in step S3407 that image A does not hold any LVBC data, the CPU 112 determines in step S3413 if image B holds a tint block pattern. If it is determined in step S3413 that image B holds a tint block pattern, the CPU 112 adopts the tint block pattern of image B as security dots after image composition in step S3414.

If it is determined in step S3413 that image B does not hold any tint block pattern, the CPU 112 determines in step S3415 if image B holds LVBC data. If it is determined in step S3415 that image B holds the LVBC data, the CPU 112 adopts the LVBC data of image B as security dots after image composition in step S3416.

If it is determined in step S3415 that image B does not hold any LVBC data, since both images A and B hold neither a tint block pattern nor LVBC data, the CPU 112 prints these images without appending any security dots. If both images A and B hold either a tint block pattern or LVBC data, the CPU 112 appends security dots to a composite image obtained by compositing images A and B, and then prints the composite image.

<Security Dot Composition Processing>

FIG. 21 is a flowchart showing details of security dot composition processing upon compositing the tint block pattern and LVBC data in steps S3405 and S3409 in this embodiment. The security dot composition processing will be described below with reference to FIG. 21.

The security dot composition processing is executed by the CPU 112 of the image processing apparatus 100. Also, assume that image A holds the tint block pattern 2101 (as an example of a first dot image in this embodiment) shown in FIG. 18, and image B holds LVBC data 2901 (as an example of a second dot image in this embodiment) shown in FIG. 22.

Figure 23:
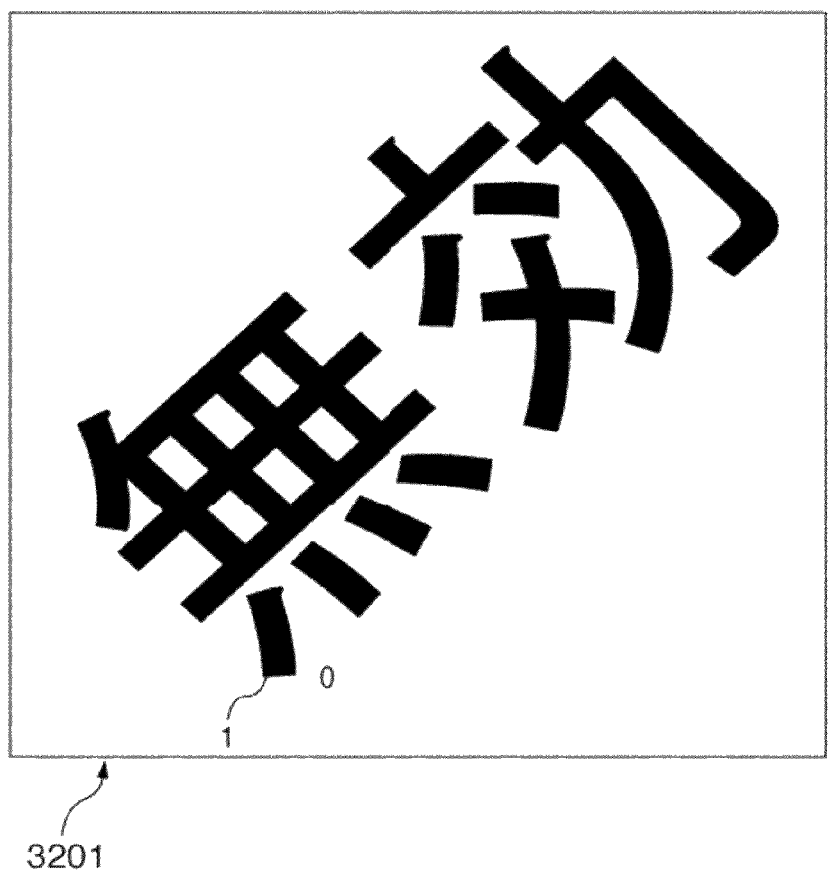
FIG. 23 is a view showing an example of a binary image generated from the tint block pattern image shown in FIG. 18.

In step S3701, the CPU 112 discriminates a latent image dot region part and background dot region part in the tint block pattern 2101, and generates data 3201 shown in FIG. 23. The data 3201 is binarized using different binary data in the latent image dot region and background dot region. For example, binary data of "1" for the latent image dot region and of "0" for the background dot region are used. The process in step S3701 is an example of a first conversion unit of this embodiment.

Figure 24:
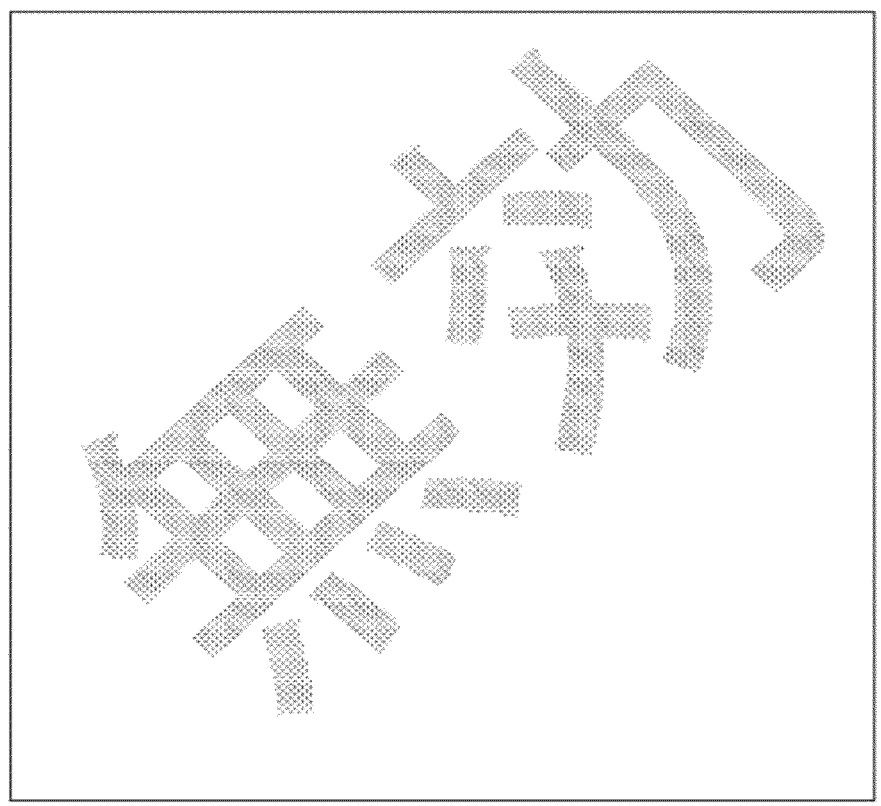
FIG. 24 is a view showing an example of an image obtained by expressing the binary image shown in FIG. 23 using dots.

In step S3702, the CPU 112 applies dither processing using a dot-dispersed dither matrix to a region including data "1" of the data 3201, that is, to "Invalid" characters to express that region as dot data, thus generating an image 3601 shown in FIG. 24. Pronunciation of words in Japanese in FIG. 24 is "mu-ko-u", which means "Invalid". The process in step S3702 is an example of a second conversion unit of this embodiment.

As the dot-dispersed dither matrix used in this case, a dither matrix that converts the LVBC data held by image B into latent image dots is suitable. When dots generated by this dither matrix is printed on paper, and that paper is scanned, the printed dots are designed to disappear.

In step S3703, the CPU 112 removes dots in a region including data "1" of the data 3201 in the LVBC data 2901, that is, in the "Invalid" characters to form outline characters, thus generating LVBC data 3501 shown in FIG. 25. The process in step S3703 is an example of a third conversion unit of this embodiment.

Figure 26:
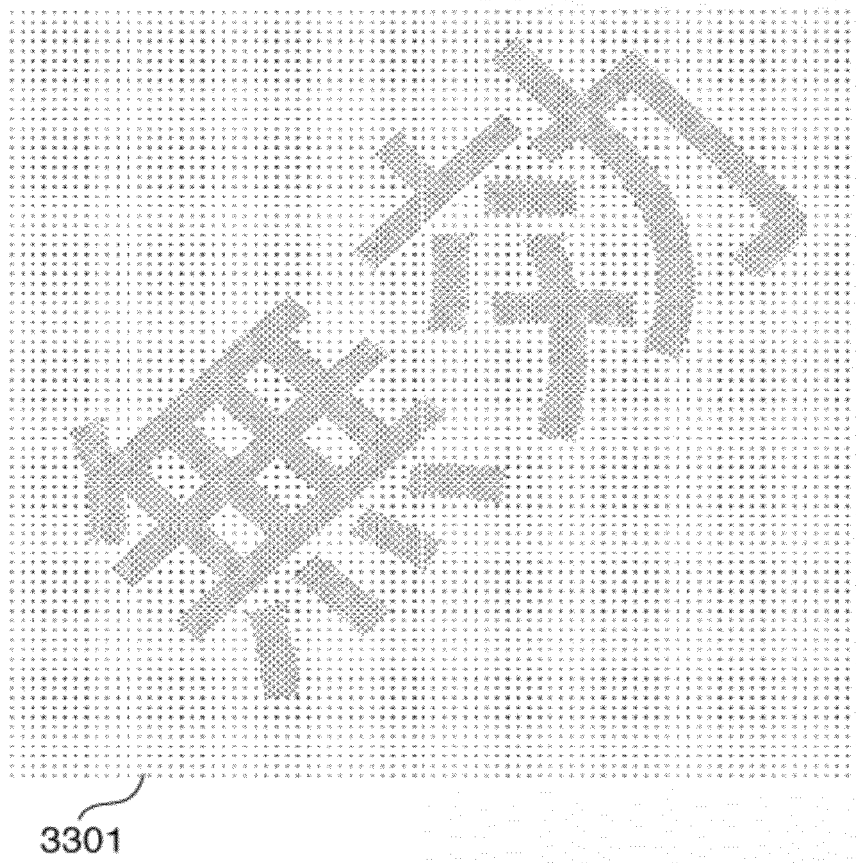
FIG. 26 is a view showing an example of an LVBC tint block pattern image generated in this embodiment.

In step S3704, the CPU 112 composites the image 3601 and LVBC data 3501 by logically ORing them, thereby generating an LVBC tint block pattern 3301 shown in FIG. 26 (as an example of a third dot image of this embodiment). The same security dot composition processing as the above method applies when image A holds LVBC data, and image B holds a tint block pattern.

<Image Data Composition Processing>

Figure 27:
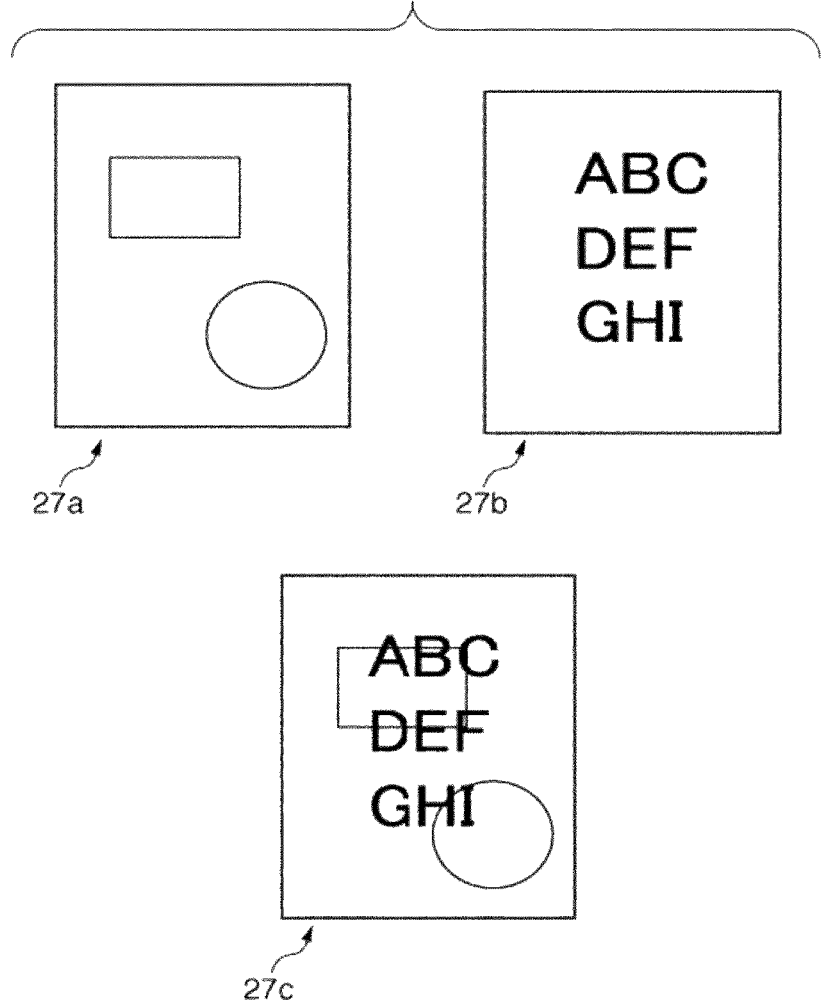
FIG. 27 is a view for explaining image data composition processing.

FIG. 27 is a view for explaining image data composition processing. In FIG. 27, an image 27a is an example of image A, and an image 27b is an example of image B. Both images A and B are those on the DRAM 116. When the user inputs an instruction to form an image using an image composition function on the operation unit, the image processing apparatus 100 composites images A and B using the image composition unit 807. Then, the user can obtain data 27c shown in FIG. 27.

<Generation Processing of Image Data with Security Dots>

Figure 28:
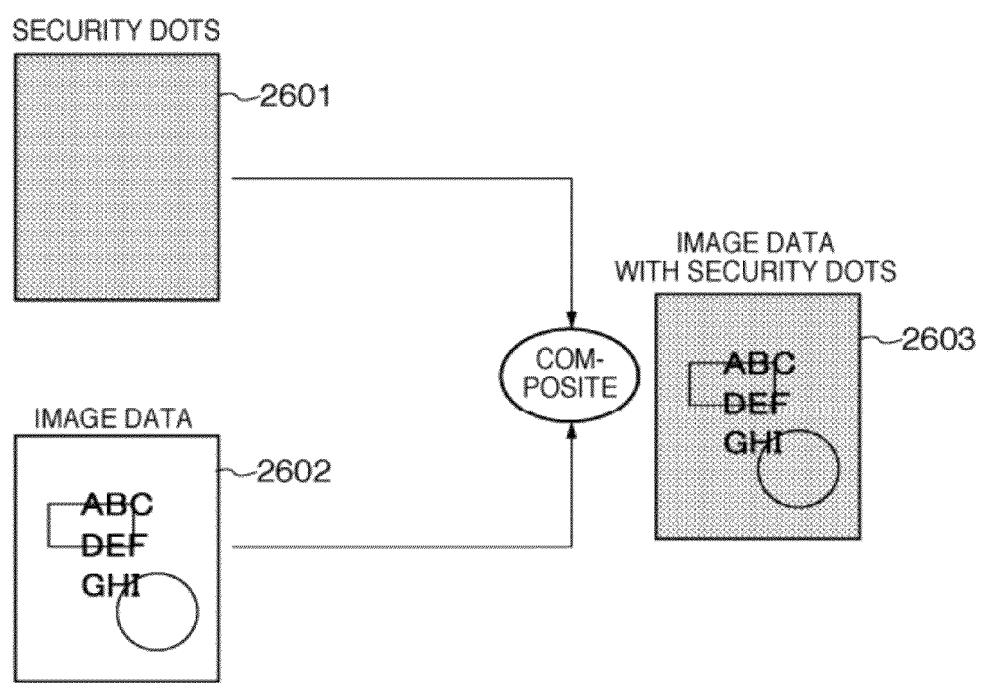
FIG. 28 is a view for explaining a method of generating image data with security dots from the security dots and image data.

FIG. 28 is a view showing a generation method of an image with security dots from security dots such as LVBC data, a tint block pattern, and an LVBC tint block pattern, and image data.

Both security dots 2601 and image data 2602 are those on the DRAM 116. The security dots 2601 are composited to the image data 2602 using the image composition unit 807 to generate image data 2603 with security dots on the DRAM 116.

As described above, new security dots are generated upon image composition of documents, and the generated security dots are appended to image data when the image data is output, thus outputting the image data without losing the effect of the security function.

In the above description, when the information processing apparatus 401 transmits a tint block pattern or LVBC data to the image processing apparatus 100, the information processing apparatus 401 generates a tint block pattern or LVBC data, and transmits the generated tint block pattern or LVBC data to the image processing apparatus 100. In place of transmitting a tint block pattern or LVBC data from the information processing apparatus 401, generation information associated with a tint block pattern or LVBC data, which is set on the user interface, may be transmitted, and the image processing apparatus 100 may generate a tint block pattern or LVBC data (i.e., a dot image) based on that information. That is, for example, the CPU 112 of the image processing apparatus 100 may serve as a dot image generation unit of this embodiment.

Note that the information associated with a tint block pattern includes, for example, character string information, date information, user ID information, and font data, and that associated with LVBC data includes, for example, character string information, date information, user ID information, and job restriction information. Hence, the processing sequence upon execution of the security dot composition processing based on information associated with a tint block pattern or LVBC data set on the user interface will be described below with reference to FIG. 29.

Figure 29:
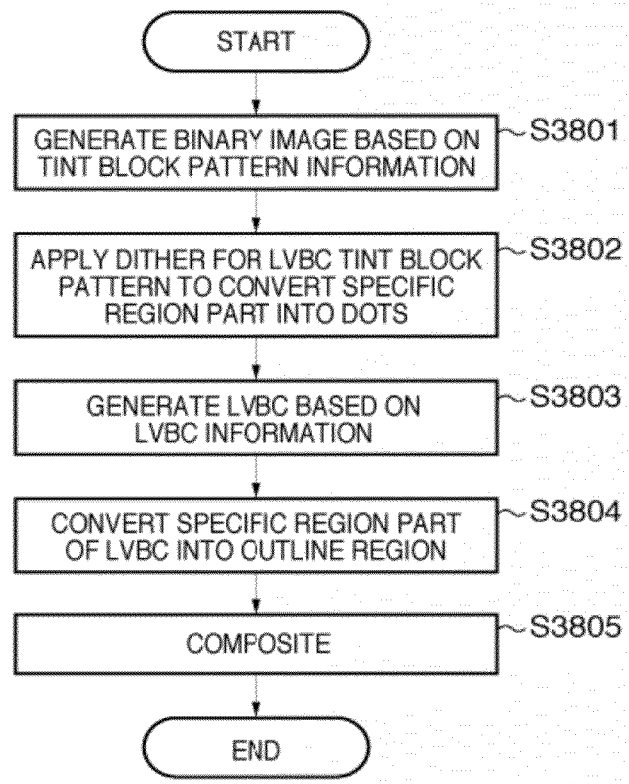
FIG. 29 is a flowchart showing the sequence of another processing upon compositing a tint block pattern image and LVBC image in steps S3405 and S3409 shown in FIGS. 20A and 20B.
Figure 30:
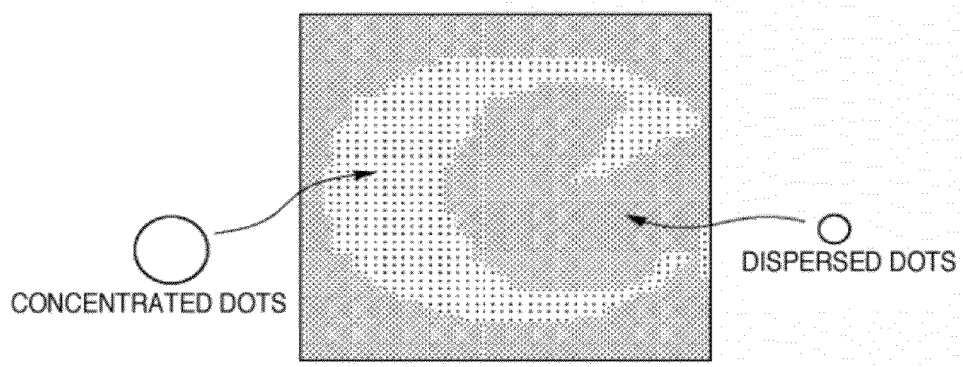
FIG. 30 is a view showing the states of dots in a latent image and background image included in a tint block pattern image.
Figure 31:
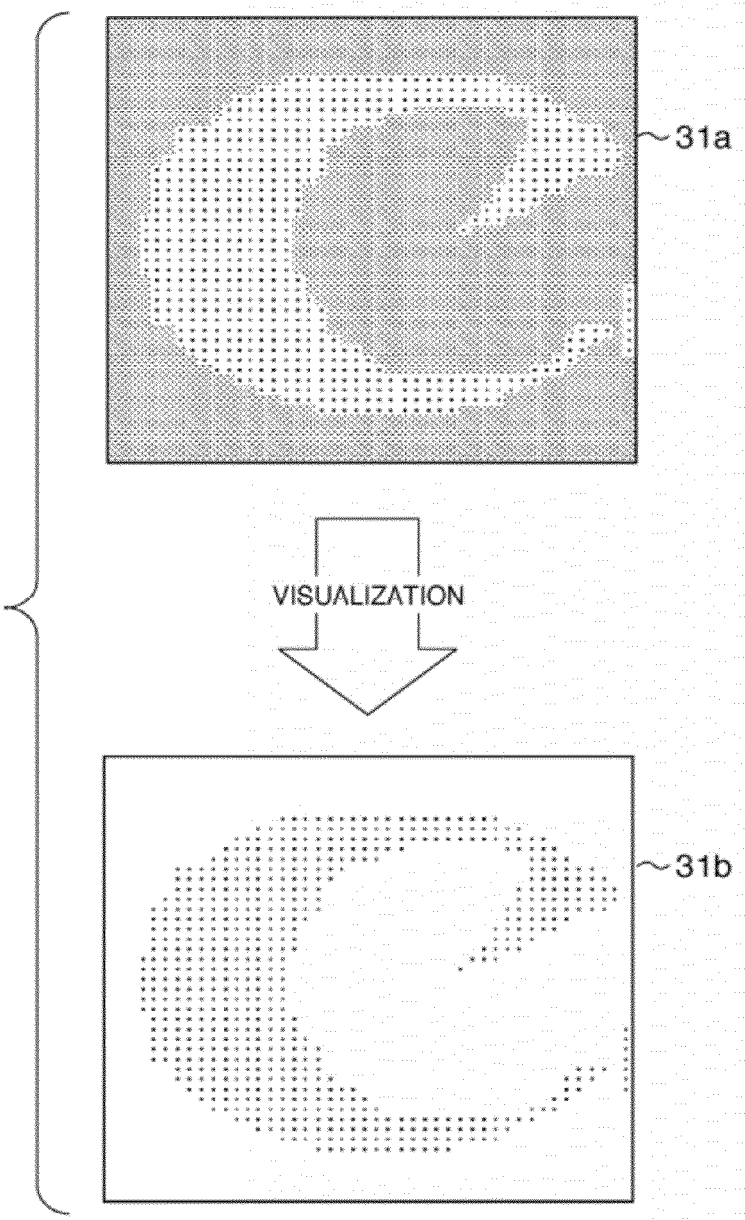
FIG. 31 is a view for conceptually explaining visualization.

FIG. 29 is a flowchart showing details of another security dot composition processing upon compositing a tint block pattern and LVBC data in steps S3405 and S3409. The security dot composition processing is executed by the CPU 112 of the image processing apparatus 100.

In step S3801, the CPU 112 rasterizes font vector data in the font vector area 1702 based on information of a tint block pattern set on the user interface, thus generating the data 3201 shown in FIG. 23. In step S3802, the CPU 112 applies dither processing using a dot-dispersed dither matrix to a region including data "1" of the data 3201, that is, to "Invalid" characters to express that region as dot data, thus generating the image 3601 shown in FIG. 24.

As the dot-dispersed dither matrix used in this case, a dither matrix that converts the LVBC data held by image B into latent image dots is suitable. When dots generated by this dither matrix is printed on paper, and that paper is scanned, the printed dots are designed to disappear.

Figure 22:
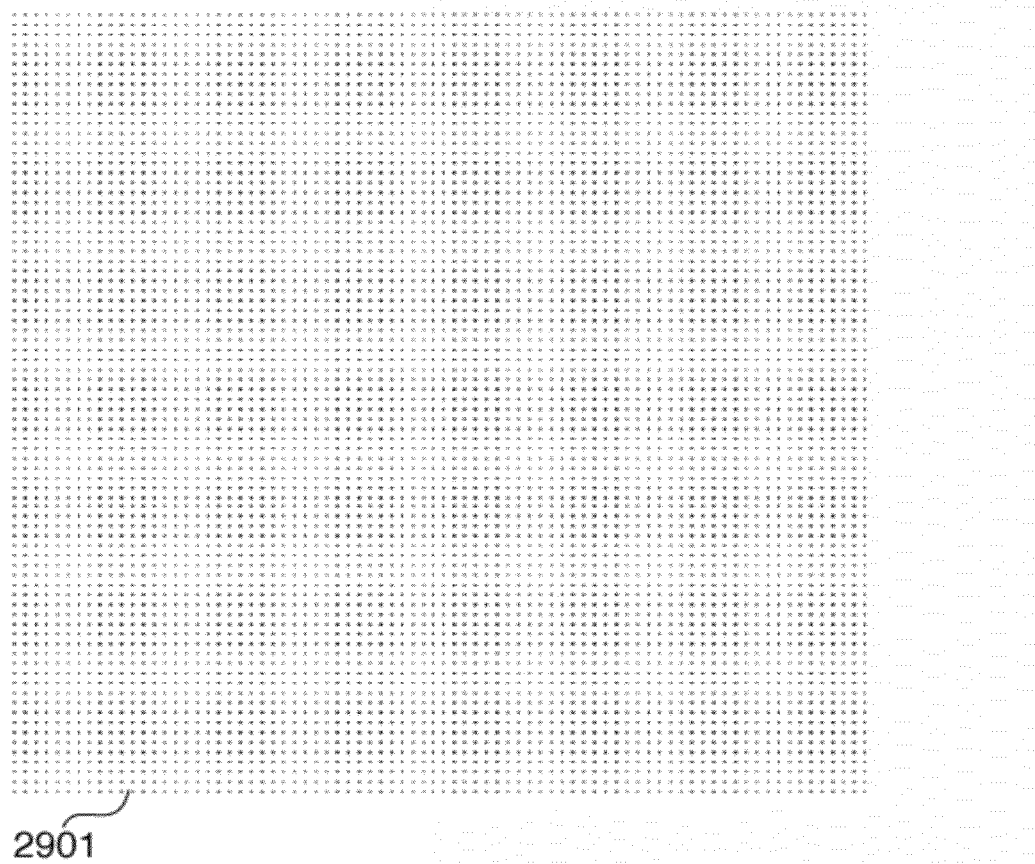
FIG. 22 is a view showing an example of an LVBC image used in this embodiment.

In step S3803, the CPU 112 generates the LVBC data 2901 shown in FIG. 22 based on information of LVBC data set on the user interface. In step S3804, the CPU 112 removes dots in a region including data "1" of the data 3201 in the LVBC data 2901, that is, in the "Invalid" characters to form outline characters, thus generating the LVBC data 3501 shown in FIG. 25. In step S3805, the CPU 112 composites the image 3601 and LVBC data 3501 by logically ORing them, thereby generating the LVBC tint block pattern 3301 shown in FIG. 26. The same security dot composition processing as the above method applies when image A holds LVBC data, and image B holds a tint block pattern.

Then, the CPU 112 composites the generated LVBC tint block pattern 3301 to image data using the image composition unit 807. As described above, new security dots are generated based on tint block information or LVBC information included in each document upon image composition of documents, and the generated security dots are appended to image data when the image data is output, thus outputting the image data without losing the effect of the security function.

<Other Embodiments>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-215920, filed Aug. 25, 2008, which is hereby incorporated by reference herein in its entirety.

What is claimed is:

1. An image processing apparatus for generating image data having a dot image used to suppress information leakage, comprising:

a generation unit configured to combine a first dot image, which is visually recognizable on a copied material and includes a latent image and a background image used to suppress information leakage, with a second dot image, which is embedded with information used to suppress information leakage, and to generate a third dot image including the latent image and the information used to suppress information leakage; and an image data generation unit configured to generate image data having the third dot image by combining the third dot image with predetermined image data, wherein, the generation unit is also configured to convert a region of the latent image and a region of the background image in the first dot image into binary data so as to have different binary data from each other, convert a region of the latent image in the binary data into dot data by expressing the region of the latent image as dots, convert the second dot image into outline data by removing dots of a region corresponding to the region of the latent image to form an outline region, and wherein the dot data is combined with the outline data to generate the third dot image in which the outline data is generated as a latent image and the dot data is generated as a background image.

2. The apparatus according to claim 1, further comprising:

a first determination unit configured to determine whether or not image data has the first dot image; and a second determination unit configured to determine whether or not another image data has the second dot image, wherein when it is determined as a result of determination by the first determination unit that the image data has the first dot image, and it is determined as a result of determination by the second determination unit that the other image data has the second dot image, the generation unit generates the third dot image, and the image data generation unit generates image data having the third dot image.

3. The apparatus according to claim 1, further comprising:
a setting unit configured to set at least one of the first dot image and the second dot image; and
a dot image generation unit configured to generate at least one of the first dot image and the second dot image in accordance with contents set by the setting unit.

4. The apparatus according to claim 3, wherein the contents set by the setting unit include information associated with a character string, a date, a user ID, and a font.

5. The apparatus according to claim 1, wherein the first dot image is a copy-forgery-inhibited pattern, and the second dot image is an LVBC image.

6. An image processing method executed by an image processing apparatus for generating image data having a dot image used to suppress information leakage, comprising:
a generation step of combining a first dot image, which is visually recognizable on a copied material and includes a latent image and a background image used to suppress information leakage, with a second dot image, which is embedded with information used to suppress information leakage, and to generate a third dot image including the latent image and the information used to suppress information leakage;
an image data generation step of generating image data having the third dot image by combining the third dot image with predetermined image data;
converting a region of the latent image and a region of the background image in the first dot image into binary data so as to have different binary data from each other;
converting a region of the latent image in the binary data into dot data by expressing the region of the latent image as dots;
converting the second dot image into outline data by removing dots of a region corresponding to the region of the latent image to form an outline region; and
combining the dot data with the outline data to generate the third dot image in which the outline data is generated as a latent image and the dot data is generated as a background image.

7. A non-transitory computer-readable medium storing an image processing program for generating image data having a dot image used to suppress information leakage, the image processing program making a computer function to:
combine a first dot image, which is visually recognizable on a copied material and includes a latent image and a background image used to suppress information leakage, with a second dot image, which is embedded with information used to suppress information leakage, and to generate a third dot image including the latent image and the information used to suppress information leakage;
generate image data having the third dot image by combining the third dot image with predetermined image data;
convert a region of the latent image and a region of the background image in the first dot image into binary data so as to have different binary data from each other;
convert a region of the latent image in the binary data into dot data by expressing the region of the latent image as dots;
convert the second dot image into outline data by removing dots of a region corresponding to the region of the latent image to form an outline region; and
combine the dot data with the outline data to generate the third dot image in which the outline data is generated as a latent image and the dot data is generated as a background image.

* * * * *